(12) United States Patent
Balcan et al.

(10) Patent No.: US 8,949,237 B2
(45) Date of Patent: Feb. 3, 2015

(54) DETECTING OVERLAPPING CLUSTERS

(75) Inventors: Maria Florina Balcan, Atlanta, GA (US); Christian H. Borgs, Boston, MA (US); Mark Braverman, Princeton, NJ (US); Jennifer T. Chayes, Boston, MA (US); Shanghua Teng, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 192 days.

(21) Appl. No.: 13/345,593

(22) Filed: Jan. 6, 2012

(65) Prior Publication Data

US 2013/0179449 A1 Jul. 11, 2013

(51) Int. Cl.
G06F 7/00 (2006.01)
G06F 17/30 (2006.01)

(52) U.S. Cl.
USPC .......................................... 707/737; 707/748

(58) Field of Classification Search
None
See application file for complete search history.

(56) References Cited

U.S. PATENT DOCUMENTS

| | | | |
|---|---|---|---|
| 7,668,821 B1 * | 2/2010 | Donsbach et al. ............ | 707/765 |
| 7,890,871 B2 | 2/2011 | Etkin | |
| 2004/0267686 A1 * | 12/2004 | Chayes et al. .................... | 707/1 |
| 2006/0048059 A1 * | 3/2006 | Etkin ............................ | 715/745 |
| 2006/0136320 A1 * | 6/2006 | Saberi et al. .................... | 705/37 |
| 2008/0082531 A1 | 4/2008 | Suarez | |
| 2008/0195664 A1 | 8/2008 | Maharajh et al. | |
| 2008/0243815 A1 * | 10/2008 | Chan et al. ......................... | 707/5 |
| 2008/0243817 A1 * | 10/2008 | Chan et al. ......................... | 707/5 |
| 2008/0294686 A1 * | 11/2008 | Long et al. ................ | 707/103 R |
| 2009/0287668 A1 * | 11/2009 | Evans et al. ........................ | 707/4 |
| 2009/0307176 A1 | 12/2009 | Jeong et al. | |
| 2011/0035379 A1 * | 2/2011 | Chen et al. .................... | 707/740 |
| 2011/0040756 A1 * | 2/2011 | Jones et al. .................... | 707/737 |
| 2011/0060738 A1 * | 3/2011 | Gates et al. .................... | 707/737 |
| 2011/0231399 A1 | 9/2011 | Zhang et al. | |
| 2011/0302163 A1 | 12/2011 | Rhinelander et al. | |

OTHER PUBLICATIONS

Jiang, et al., "Tag Recommendation based on Social Comment Network", In International Journal of Digital Content Technology and its Applications, vol. 4, Issue 8, Nov. 2010, pp. 110-117.

(Continued)

*Primary Examiner* — Tony Mahmoudi
*Assistant Examiner* — Tuan A Pham
(74) *Attorney, Agent, or Firm* — Steve Wight; Judy Yee; Micky Minhas

(57) ABSTRACT

A technique for identifying overlapping clusters of items in a data set. The technique may be used in connection with a social network or other on-line environment in which users express approval for other users, such as through votes, tags or other inputs. These expressions of approval may be used to form clusters such that entities assigned to a cluster have a higher metric of approval from other entities within the cluster than from outside the cluster. Such clusters may be arrived at through a computationally efficient approach that involves randomly selecting one or more entities as a seed for a cluster. The cluster may be grown by testing other entities, similar to those already in the cluster, to determine whether they are more preferred by those already in the cluster than those outside the cluster. Once a cluster is grown to a desired size, it may be pruned.

15 Claims, 8 Drawing Sheets

(56) References Cited

OTHER PUBLICATIONS

Kammergruber, et al., "Using Association Rules for Discovering Tag Bundles in Social Tagging Data", In Proceedings of International Conference on Computer Information Systems and Industrial Management Applications, Oct. 8-10, 2010, pp. 414-419.

Kammergruber, et al., "Discovering Communities of Interest in a Tagged On-line Environment", In Proceedings of International Conference on Computational Aspects of Social Networks, Jun. 24-27, 2009, pp. 143-148.

Lajmi, et al., "Extended Social Tags: Identity Tags Meet Social Networks", In Proceedings of Symposium on Social Intelligence and Networking, Aug. 29, 2009, 7 pages.

Chen, et al., "A game-theoretic framework to identify overlapping communities in social networks", In Data Mining and Knowledge Discovery, vol. 21, Issue 2, Sep. 2010, pp. 224-240.

International Search Report, received in PCT Application No. PCT/US2013/020185, mailed Apr. 26, 2013.

* cited by examiner

US 8,949,237 B2

DETECTING OVERLAPPING CLUSTERS

BACKGROUND

There are many instances in which it is useful to identify from a large set of items one or more subsets of related items. In addition, it is often useful to assign a "tag" to a subset of related items, which indicates a manner in which the items are related. Tags can be selected to have a semantic meaning, providing a mechanism for humans to understand the nature of the subsets and select subsets for specific reasons.

Identification of subsets of items, and tagging of items or subsets, may occur, for example, in connection with social networks or other computer systems that are accessible to large numbers of people. Subsets of people with a common interest may be identified. The resulting subsets may have tags that allow other users of the system to determine whether they share a common interest with the identified subsets. In this way, people sharing common interests can connect using computer-based communications supported by the social networking system.

Though, identifying subsets and applying tags can occur in other contexts and involving items other than people. For example, in some social networking systems users post photographs or other items potentially of interest to other users. These items may be tagged to indicate their content in a human-understandable form, allowing users to search for items related to a particular topic or to find subsets of related items.

In some instances, tags are first assigned to items such that they can then be segregated into subsets based on the tags. In such scenarios, tags are assigned manually. Though, assigning tags manually can be time consuming or inaccurate because different users may tag related items differently. It is also known to first identify subsets of related items and then assign tags to the subsets in either in an automated or manual fashion. Automated processing to identify subsets of related items is sometimes called "clustering."

SUMMARY

Subsets of related items in a set may be identified using a computationally efficient process such that even large sets of data can be feasibly processed. In some embodiments, processing to form a subset may be done in polynomial time such that computational time is proportional to on the number of items in the set. The subsets formed may have overlapping members. As a result, the subsets formed may more naturally represent data sets that may exist in real world problems.

In one aspect, the invention may relate to a method of operating a computing system to produce clusters of items from a data set. The method may entail selecting a subset of items from the data set, which may act as a seed for a cluster. Candidate items from the set may be iteratively added to the subset. For each candidate item, one or more values may be determined to indicate a degree of relatedness to items in the subset and/or a degree of relatedness to items outside the subset. Each candidate item may be selectively added to the subset based on the one or more degrees of relatedness and one or more degree of relatedness criteria. The degree of relatedness criteria may facilitate addition to the subset of candidate items that are more similar to items already in the subset than they are to items not in the subset. Once enough candidate items have been added to the subset that the subset has a size above a threshold size, the subset may be pruned by selectively removing items from the subset that do not meet at least one of the one or more degree of relatedness criteria.

In another aspect, the invention may relate to a system for implementing a social network. The system may include a database of information relating to a plurality of users. The database may store information, associated with each of the plurality of users, indicating approval of an aspect of the user by others of the plurality of users. The system may include one or more computing devices coupled to the database. The computing devices may be configured to identify clusters of users based on the information in the database by iteratively adding users to a subset. Iterative processing may entail, for a candidate user, determining a degree of relatedness to users in the subset and/or a degree of relatedness to users outside the subset. Based on this information, the candidate user may be selectively added to the subset when the degrees of relatedness indicate that the candidate user is more related to users within the subset than to users outside the subset. After adding users to the subset, users that do not meet at least one of the one or more degree of relatedness criteria may be removed from the subset.

In yet a further aspect, the invention may relate to at least one computer-readable storage medium comprising computer-executable instructions that, when executed by at least one processor, perform a method of forming clusters. The method may entail receiving inputs from a plurality of entities in a set, each input indicating approval for another entity in the set. A database storing indications of approval associated with each of the plurality of entities in the set may be maintained and processed. Processing of the database may lead to a determination of one or more clusters in the set. The clusters may each comprise entities for which a metric of approval of members within the cluster exceeds a metric of approval from entities in the set that are not in the cluster. Based on the one or more clusters, a suggestion may be presented to an entity. That suggestion may relate to an action involving interaction with one or more other entities that are within at least one of the one or more clusters.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
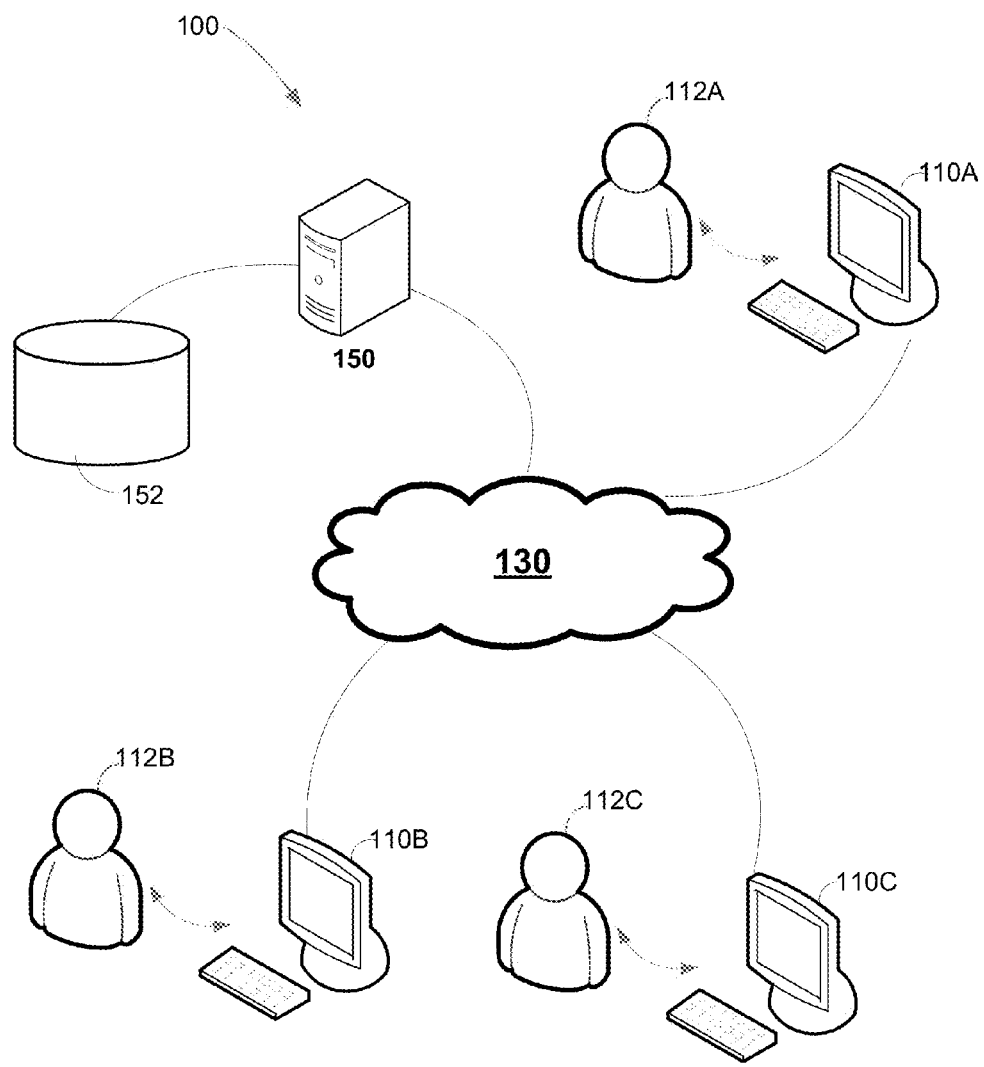
FIG. 1 is a conceptual sketch of a social network according to some embodiments.

The inventors have recognized and appreciated that many systems that operate based on clusters can provide improved performance from a computationally efficient way to form clusters of items that are related to one another. Rather than using conventional set partitioning techniques, an efficient identification of clusters can be achieved by allowing clusters to overlap. Accordingly, in contrast to some conventional systems described in the literature in which the term "clusters" is understood to describe only not non-overlapping subsets, as used herein, the term "clusters" refers to susbsets of a data set that may be overlapping and/or non-overlapping.

Such clusters may accurately represent related groups of items that occur in many types of systems, including social networks and information storage and retrieval systems. Though, clustering may be performed on any data set in which some metric of relatedness of items is available. The clusters may be formed as subsets of the data set such that, for each subset, there is a high probability that the items in the subset are more related to each other than to items not in the subset.

Accordingly, in some embodiments, the clusters or the individual items in the cluster may be "tagged." The tag may be an indication that an item to which the tag is assigned has a certain characteristic. In the case of a cluster, the tag may indicate a dimension in which items in the cluster are related. For example, when processing a data set representing people who have visited restaurants and relatedness indicates a common taste in restaurants, the tags may indicate a particular style of restaurants favored by people in a cluster. Such tags may be assigned by a human and may have semantic meaning. Though, it should be appreciated that a tag need not have semantic meaning and may serve only as a means to identify items that share a common trait, without revealing what that trait is. Moreover, it should be appreciated that the tag need not be assigned by a human. Alternatively or additionally, the tags may be assigned through an automated analysis that reveals correlations among characteristics of items assigned to a cluster.

Whether or not tagged, subsets may be formed in a computationally efficient way, even for large data sets. For example, clusters may be identified by processing that scales in polynomial time in proportion to the size, N, of the data set. Further, a technique that can be shown, through mathematical proofs, to identify relevant clusters in a data set may be desirable in some scenarios.

Accordingly, in some embodiments, subsets of items are identified through a process of selecting seed subsets and growing the subsets. A subset may be grown by iteratively adding additional items that meet relatedness criteria. These relatedness criteria, for example, may specify a degree of relatedness to items already in the subset that is above a first threshold and/or a degree of relatedness to items not in the subset that is below a second threshold. These thresholds may be determined in any suitable way and may be defined in advance or may be determined dynamically. Dynamic selection, for example, may be based on statistics of the data set, such as its size or variability in degrees of relatedness.

An additional threshold may be used to control a number of iterations performed to add additional items to the subset. Once a subset reaches this threshold size, a pruning process may be performed. Pruning may entail removing from the subset items that, though they might have met relatedness criteria at the time they were added to the subset, do not meet those relatedness criteria based on items subsequently added to the subset. Once the subset is pruned such that the items in the subset meet the relatedness criteria, the pruning may end. Though, in some embodiments, the process of growing and pruning may similarly be performed iteratively, with items being added until some upper limit is reached and then items being pruned. This process may be repeated until all items in the set are processed or some other stop condition is reached.

Any suitable measure of relatedness may be used, and the measure of relatedness may depend on the nature of the data set or the intended use of the subsets. For example, the measure of relatedness may indicate affinity of one item in the data set for another. These affinities need not be mutual.

Techniques as described herein for identifying clusters and/or tagging items assigned to each cluster may be applied in any scenario in which information about a set of items can be represented as "affinities" among the items. A metric indicating affinity may be used to indicate a degree of relatedness. There are a wide variety of scenarios in which information can be represented in this fashion. For example, "affinity systems" are known, and the techniques as described herein may be applied in a known affinity system.

Scenarios in which the techniques as described herein may be applied occur in computerized systems that can process information supplied by multiple individuals or other entities. As a specific example, "crowd-sourcing" is a technique in which information is gathered from multiple people using a computer network. The information may be collected about any suitable type of item, including people or products for sale. Through a crowd-sourcing system, information defining an affinity metric might also be collected. For example, user inputs might specify products that belong together or the likelihood that one product would be purchased at the same time as another or the belief of one person in the "crowd" inputting data that others in the "crowd" are inputting valid data.

For purposes of illustration, the principles of clustering and tagging are described as applied in connection with a social network. The items to be clustered may be members of the social network. As a specific example, the tags may be interests of the members. Affinity metrics may be determined based on expressions of agreement or disagreement, made by one member for opinions expressed by another member.

FIG. 1 provides an example of a social network 100 that may include a component to form clusters and utilize the clusters in either a tagged or un-tagged form. Social network 100 connects multiple individuals who are members of the social network in a way that allows them to share information. In the example of FIG. 1, individuals 112A, 112B and 112C are illustrated. It should be recognized that three individuals are shown for simplicity. However, a social network may join any number of people, and likely may join hundreds or thousands of people.

Each of the individuals 112A, 112B and 112C accesses the social network 100 through a user computer, here illustrated as user computers 110A, 110B and 110C. In this example, user computers 110A . . . 110C are illustrated at desktop computers. However, it should be appreciated that an individual may access social network 100 through any computing device, and desktop computers are shown for simplicity of illustration.

Each of the user computers 110A . . . 110C are coupled through a network 130 to a server 150 managed by an operator of the social network. In this example, network 130 may be the Internet. Though, it should be appreciated that any network or combination of networks that allow exchanges of information among multiple individuals may be used to form a social network.

Server 150 is an example of a computing device that may manage interactions between the individuals that are members of social network 100. Server 150 may be programmed with computer executable instructions that perform functions that allow an individual to start a social network or invite other individuals to join the social network. Server 150 also may be programmed to allow individuals who are members of social network 100 to access information from or communicate with other individuals who are also members of social network 100.

Server 150 is coupled to database 152. Database 152 may hold information relating to management of social network 100. For example, database 152 may store information identifying individuals who are members of social network 100. Database 152 may also store information supplied by individuals who are members of the social network. Server 150 may manage access to such information, ensuring that information intended for sharing among the individuals that are members of social network 100 may access that information.

Social networks are known, and social network 100 may be implemented using techniques as are known in the art. However, server 150 may be modified to incorporate one or more components to form clusters of members of the social network, to apply tags to the clusters and to perform one or more operations based on the clusters and/or tags.

Figure 2A:
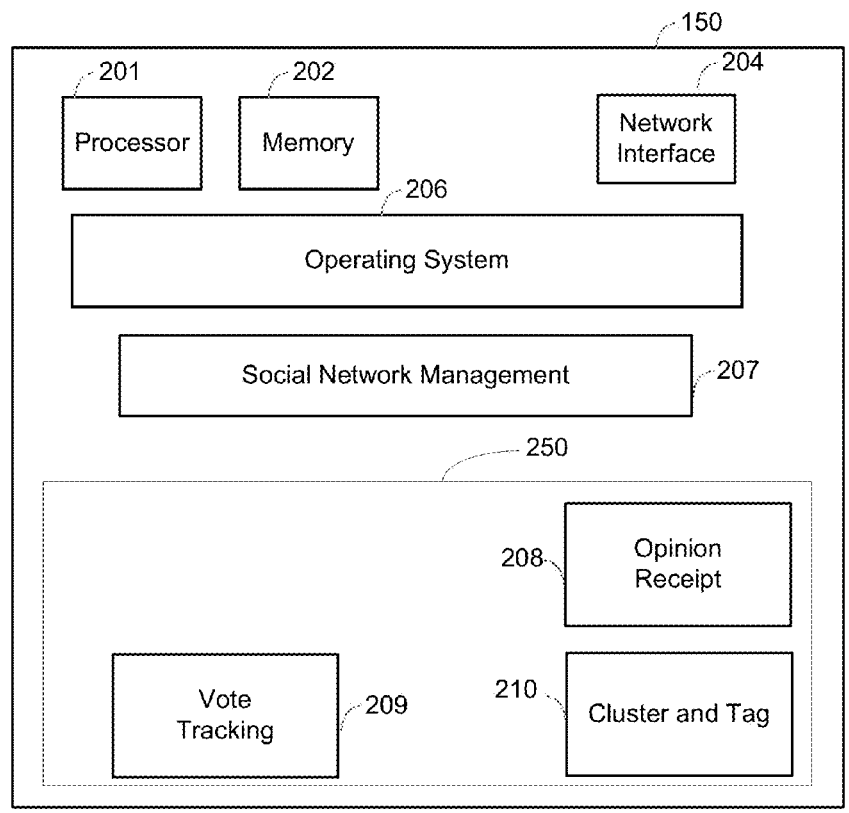
FIG. 2A is a functional block diagram of a server implementing the social network of FIG. 1.

FIG. 2A is a functional block diagram of server 150. It should be appreciated that FIG. 1 and FIG. 2A illustrate server 150 as a single computing device. However, the functions depicted in the functional block diagram of FIG. 2A may be implemented across multiple computing devices.

FIG. 2A shows that server 150 includes hardware components, all of which may be as known in the art. As illustrated, in some embodiments, server 150 comprises a processor 201, memory 202 and a network interface 204.

Processor 201 may be a processor, or combination of processors or processor cores, as known in the art. For example and not limitation, processor 201 may be a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device.

Memory 202 may store data and/or software modules containing computer-executable instructions that, when executed by processor 201, perform a desired function. Memory 202 may be a computer-readable storage medium as is known in the art or any suitable type of computer-readable storage medium. For example and not limitation, memory 202 may be RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, other semiconductor devices, or other tangible computer storage medium or combination thereof.

Server 150 may include any suitable number of network interfaces 204. Each network interface may be an interface suitable for wired and/or wireless communication and may be implemented through any suitable combination of hardware and software configured to communicate over a network. For example, a network interface may be implemented as a network interface driver and a network interface card (NIC). The driver may be configured to receive instructions from other components of server 150 to perform operations with the NIC. Network interfaces 204 allow server 150 to communicate with user computers 110A . . . 110C over network 130 (FIG. 1).

Server 150 may also include modules configured to perform specific functions. In the illustrated embodiment, server 150 includes an operating system 206 (OS), social network management module 207 and clustering module 250. Though, server 150 may have any suitable modules. Modules may be implemented in hardware, software, or any suitable combination thereof. In some embodiments, a module may comprise computer-executable instructions. The instructions may be stored in memory 202 and executed by processor 201.

OS 206 may manage the activities and sharing of resources of server 150. OS 206 may provide various functions and manage server 150 through various components. These components may include, for example and not limitation, dynamically linked libraries (e.g., a dynamic-link library), application programming interfaces (APIs), component object models (COMs), globally unique identifiers, registry keys, or any uniquely identifiable part of OS 206.

OS 206 may be implemented using techniques as are now known in the art for implementing operating systems. Though, any suitable techniques, whether now known or hereafter developed, may be used to implement OS 206. In some embodiments, operating system 206 may be a conventional operating system.

Social network management module 207 may perform functions associated with establishing a social network, such as social network 100. The functions performed by social network module 207 may be functions as are performed by conventional social networks. Those functions may include admitting new members to the social network, receiving information from members of the network and sharing information from one member of the network with other members of the social network. Though FIG. 1 illustrates a single social network hosted by server 150, it should be appreciated that server 150 may support multiple independent or overlapping social networks. Accordingly, social network management module 207 may also perform functions relating to segregating information provided by members of one social network from members of other social networks. However, such functions are known in the art and social network management module 207 may be implemented using known techniques or in any other suitable way.

In the embodiment illustrated, server 150 also includes a clustering module 250. Clustering module 250 may perform functions associated with identifying clusters of users based on affinities among the members. Those functions may include receiving and storing information used to form the clusters, such as opinions from members of the network on one or more topics and votes cast for or against the members or their posting on the social network. These votes, when cast by one member for another member or something associated with another member may serve as the basis for deriving affinity metrics.

FIG. 2A illustrates that clustering module 250 includes sub-modules to perform functions associated with forming clusters. FIG. 2A illustrates that clustering module 250 contains opinion receipt sub-module 208, vote tracking sub-module 209 and clustering and tagging sub-module 210. Though, it should be recognized that these sub-modules are illustrative, not limiting, and that clustering module 250 alternatively or additionally may contain other sub-modules.

The sub-modules in clustering module 250 may interact to generate clusters containing members of social network 100. Opinion receipt sub-module 208 may receive opinions, relating to one or more topics, from members of the social network. Opinion receipt sub-module 208 may store the opinions in a format that allows opinions relating to the same or similar topics expressed by multiple members of the social network to be identified and processed together.

Vote tracking sub-module 209 may receive and store information relating to votes that members of the social network cast for other members or for items associated with other members. For example the votes may reveal agreement or disagreement with opinions expressed by other members. Accordingly, a vote may serve as an expression of affinity for one member by another. The votes collected by vote tracking sub-module 209 may therefore be the basis of affinity information used to form clusters.

The vote information may be organized in any suitable way. The organization may be based on the manner in which the vote information is used to determine affinities among members of the social network. In some embodiments, the vote information may indicate, in general, affinity of one member for another. Such vote information may be reduced to a metric, such as the number of times one member casts a vote of approval directly for another member or anything associated with the other member. As a specific example, a social network may support a user interface through which members make posts of interest to themselves and other members "vote" by indicating whether they like or dislike the post. In such a scenario, the vote information could represent the number of "like" votes one member makes for another. Though, the vote information may be captured as a ratio of "likes" to "dislikes", a frequency of "likes" or any other suitable metric.

In other embodiments, the vote information may be context specific. The vote information may be stored in a way that the context is retained. For example, votes may be collected about opinions relating to a specific topic such as favorite restaurants. In this case, vote information may be stored in such a way as to allow affinity information to be derived relating specifically to taste in restaurants. Though, it should be appreciated that taste in restaurants is just one example of a context in which vote information, or other indications of affinity, may be collected.

Clustering module 250 may also include a clustering and tagging sub-module 210. Clustering and tagging sub-module 210 may be activated in response to any suitable trigger. The trigger, for example, may be a requested operation by a member that can be performed using information on clusters or tagged members. For example, a member may request information on other users that share common interests. Though, such an operation need not be initiated by a member. In social networks in which members have consented to receive information from advertisers, the trigger may be an advertiser requesting information on users in a cluster sharing a common interest so that advertising material may be sent to those users. Alternatively or additionally, the clustering operation may be repeated periodically or from time to time as data is collected.

Figure 2B:
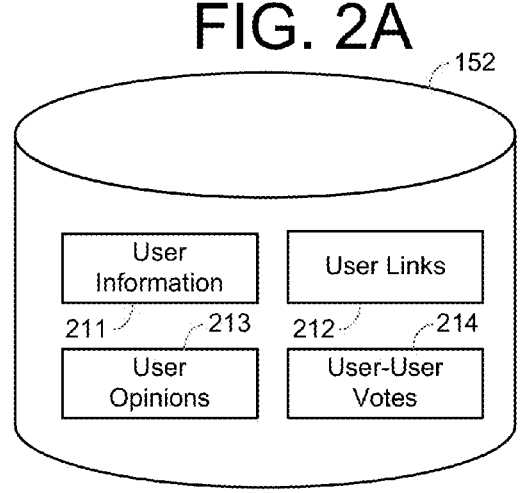
FIG. 2B is a block diagram conceptually illustrating information maintained in a database used in the social network of FIG. 1.

Regardless of the trigger, in response, clustering and tagging sub-module sub-modules 210 may access database 152 and form clusters of members based on the information that has been stored there. To support clustering, database 152 may store multiple types of information. FIG. 2B conceptually illustrates some of the types of information that may be stored in database 152 to facilitate management of social network 100 in a way that allows clusters to be identified. FIG. 2B shows, as an example, that database 152 contains user information 211. User information 211 may identify users who subscribe to the social networking services provided through server 150.

Database 152 may also store user links. In a social network, members are added to the network based on a link to an existing member of the network. Social network management module 207 may maintain links, stored as user links 212, that identify users connected through social network 100.

Additionally, database 152 may contain user opinion information 213. User opinion information 213 may be stored by opinion receipt sub-module 208. This information may be stored in any suitable way. Likewise, database 152 may contain user to user vote information 214, which may be stored by vote tracking sub-module 209, each time a user casts a vote, which, for example, may be a vote for another user, a post by another user or any other item associated with another user.

Information in database 152 may be collect in any suitable way, including through express or implied user inputs. FIGS. 3, 4A, 4B, and 5 illustrate graphical user interfaces that may be presented to members of a social network during some of the operations performed by server 150 to collection such inputs. The illustrated interfaces may appear on the displays associated with user computers, such as user computers 110A . . . 110C (FIG. 1).

Figure 3:
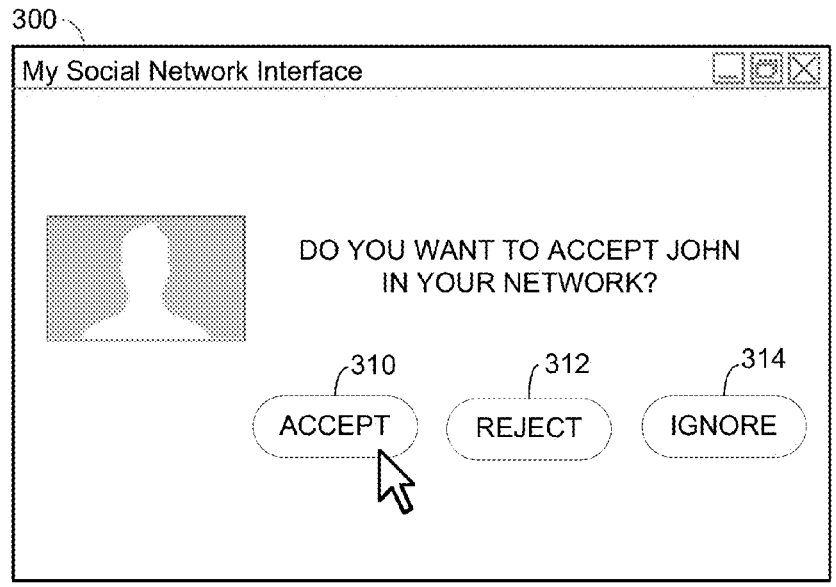
FIG. 3 is a sketch of a graphical user interface, presented by a social networking system, through which members may be added to the social network.

FIG. 3 illustrates a graphical user interface 300 that may be presented to a first user. Through the graphical user interface 300, the first user may add a second user to the social network. Though, any suitable mechanism may be used for managing the social network. In this example, a second user has sent a request to the first user, triggering social network management module 207 (FIG. 2A) to generate graphical user interface 300. Through graphical user interface 300, the first user may select control 310 that accepts the second user into the social network of which the first user is already a member. Other options, represented by controls 312 and 314, may also be present. However, in the embodiment illustrated, the first user has elected to accept the second user into the social network. Accordingly, the second user, designated as "John" in this example, is added to the social network.

Figure 4A:
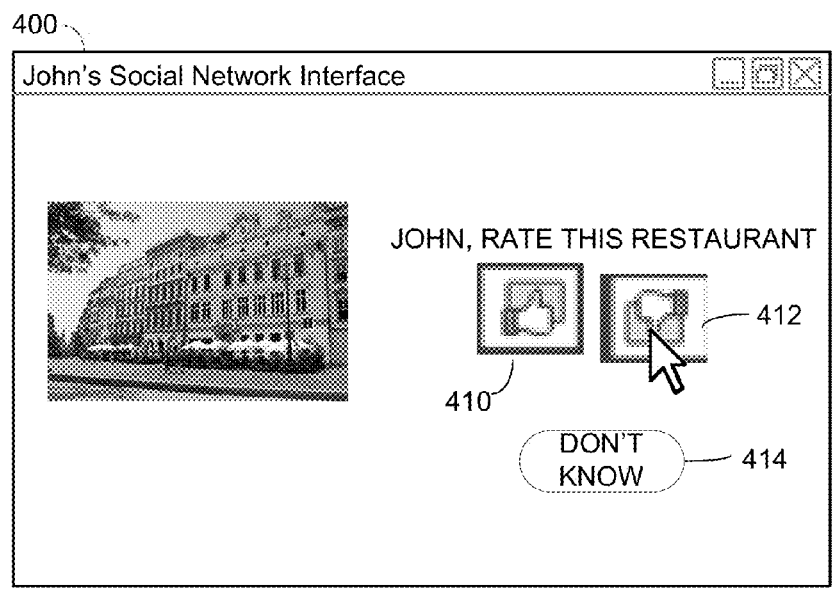
FIG. 4A is a sketch of a graphical user interface through which a member of a social network may express an opinion.

FIG. 4A illustrates a further graphical user interface that may be presented to the second user, John in this example, as a member of the social network. In this example, graphical user interface 400 is presented to John to obtain an opinion. Graphical user interface 400 may be generated by opinion receipt sub-module 208 (FIG. 2A). In this example, opinion receipt sub-module 208 is obtaining an opinion relating to a restaurant. Though, it should be recognized that graphical user interface 400 provides just one example of the types of information about which opinions of members of the social network may be received. Further, it should be appreciated that opinions of one member of the social network are just an example of an item, associated with a user, about which other users may vote so as to generate affinity information.

Graphical user interface 400 may be presented in response to any suitable triggering event. For example, the second user, John, may provide an input expressly indicating a desire to provide an opinion. In other embodiments, clustering module 250 may periodically poll members of the network requesting opinions. As yet a further example, a sub-module of clustering module 250 may monitor input provided by members interacting with the social network system to detect input indicating a connection with a topic about which an opinion may be solicited. As an example, the second user, John, may send a message through the social networking system containing the name of the restaurant to be ranked or other indication that John has a connection with the restaurant. Accordingly, it should be appreciated that the triggering event for receiving opinions is not critical to the invention.

Regardless of the triggering event, opinion receipt sub-module 208 may collect through graphical user interface 400 an opinion regarding the topic presented in graphical user interface 400. Opinion receipt sub-module 208 may receive opinions in any suitable format. In the example illustrated in FIG. 4A, the opinion collected may take on one of a discrete number of values. Accordingly, graphical user interface 400 contains interface elements through which a user may input one of a discrete number of choices representing the member's opinion. In the example of FIG. 4A, graphical user interface 400 contains a control 410, a control 412 and a control 414. Control 410 may be selected to express a favorable opinion. Control 412 may be selected to express an unfavorable opinion. Control 414 may be selected to indicate that the member expresses no opinion.

In this example, each opinion may be expressed as a plus one, a minus one, or a zero. A plus value indicating a favorable opinion and a negative value indicating an unfavorable opinion. A zero may indicate no opinion has been expressed. Representing opinions as having a value from a set consisting of $\{-1, 0, +1\}$ may simplify mathematical operations used to form affinity information. However, it should be recognized that any suitable format may be used for representing opinions.

Figure 4B:
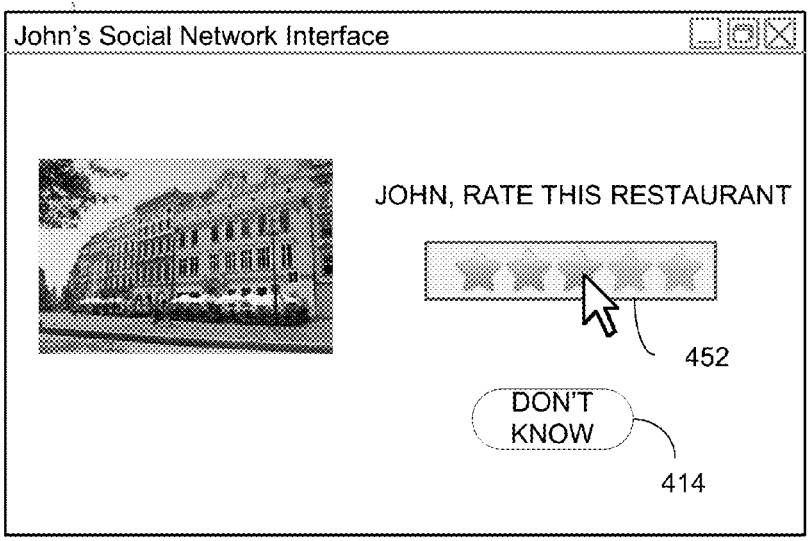
FIG. 4B is a sketch of an alternative embodiment of a graphical user interface through which a member of a social network may express an opinion.

FIG. 4B provides an example of a graphical user interface through which an opinion represented in an alternative format may be obtained. Graphical user interface 450 may be presented by clustering module 250 (FIG. 2A) in the same scenarios as graphical user interface 400 (FIG. 4A). However, graphical user interface 450 differs from graphical user interface 400 in that it is configured to receive an opinion that may take on more than two values. In graphical user interface 450, control 452 is presented to a member of a social network for receiving an opinion. In this example, the opinion may be expressed as one of a discrete number of choices. Specifically, control 452 allows the member to express an opinion as a number of stars. One star may express a relatively unfavorable opinion, while five stars may express a relatively favorable opinion. Two, three or four stars may be selected to express opinions in between. As with graphical user interface 400, graphical user interface 450 includes a control 414, which a user may select to indicate that the user has no opinion or does not wish to express an opinion.

Opinion receipt sub-module 208 (FIG. 2A) may record an opinion based on the number of stars specified through control 452. A value for the opinion expressed may be stored by opinion receipt sub-module 208 in any suitable format. For example, a number from the set $\{0, 1, 2, 3, 4, 5\}$ may be stored to represent the number of stars selected through control 452. Though, it should be recognized that any suitable value may be correlated to any user input, and the specific value stored to reflect user input expressing an opinion may vary from scenario-to-scenario. As an example of a possible variation, the value stored to reflect an opinion expressed by a member may vary non-linearly in proportion to the number of stars selected through control 452.

As an example of another possible variation, though controls 410, 412 and 452 allow a discrete number of choices for an opinion, there is no requirement that an opinion expressed by a member be selected from a set of discrete choices. In some embodiments, a graphical user interface, such as graphical user interface 450, may include a control through which a user may express an opinion corresponding to a point in a continuous range of values. Such inputs may be obtained for example, by controls shaped as sliders or text boxes in which a user may enter a number, as examples of possible variations. Accordingly, it should be recognized that the format in which opinions are input and stored for use by clustering module 250 are not limitations on the invention.

Figure 5:
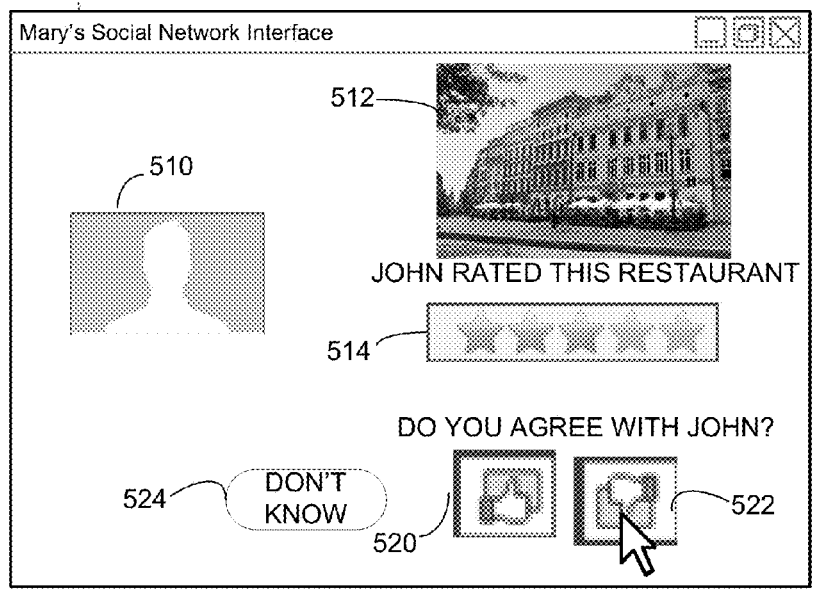
FIG. 5 is a sketch of a graphical user interface through which a first member of a social network may express approval of a second member.

In addition to obtaining opinions, clustering module 250 may also collect information about agreement or disagreement with those opinions by other members of the social network. Indications of agreement or disagreement can be the basis of affinity metrics used to determine a degree of relatedness among members as part of a process of forming clusters. FIG. 5 illustrates a graphical user interface 500 through which a member may input information that clustering module 250 interprets as an expression of affinity among members.

In the scenario illustrated in FIG. 5, vote tracking sub-module 209 (FIG. 2A) has presented graphical user interface 500 to a third member of the social network, identified as "Mary" in FIG. 5. Though, it should be appreciated that a graphical user interface in the format of graphical user interface 500 may be presented to any one of the members of social network 100, including the user who invited John into the social network.

A graphical user interface in the form of graphical user interface 500 may be presented to a member of the social network at any suitable time. In some embodiments, vote tracking sub-module 209 may present graphical user interface 500 in response to a member viewing information about a topic on which another member has expressed an opinion. In the example of FIG. 5, graphical user interface 500 relates to a restaurant about which John has expressed an opinion. Accordingly, graphical user interface 500 may be presented to Mary if Mary requests information about the same restaurant. Alternatively, graphical user interface 500 may be presented to a member upon vote tracking sub-module 209 identifying in a communication from a member that the member may have a reason to consider an opinion expressed by a member or otherwise provide input that directly or indirectly indicates approval or disapproval of opinions of members or categories of members. Though, it is not a requirement that an affirmative event occur. For example, a member may be asked to express approval or disapproval about another member, either directly or indirectly by being asked for input about an item associated with the user, at random times.

Regardless of the event that triggers graphical user interface 500 to be presented to a member, an expression of approval or disapproval may be obtained from the member through the graphical user interface. To facilitate obtaining such an expression, graphical user interface 500 may provide information about the member or members about which approval or disapproval is to be expressed. In this example, graphical user interface 500 includes item 510, which identifies the member that expressed an opinion. In the illustration of FIG. 5, item 510 may be a photo of the member that expressed an opinion. Though, a member may be identified in any suitable way.

Graphical user interface 500 may also include information about a context in which the expression of approval or disapproval applies. Graphical user interface 500 includes item 512 providing information about a topic on which the member expressed an opinion. In this example, the opinion was expressed about a restaurant. Item 512 includes a photo depicting the restaurant. Though, as noted above, information may be presented through graphical user interface 500 in any suitable form.

Further, graphical user interface 500 may include item 514 providing information about the opinion. In this example, item 514 is in the form of a graphical indication of an opinion using a number of stars. Such display may be appropriate for an opinion entered through a control such as control 452. Though, any suitable representation, including a textual description of the opinion, may be incorporated in graphical user interface 500.

Graphical user interface 500 also includes elements through which a member, Mary in this example, may express a degree of affinity with another member. In this example, affinity is expressed in terms of agreement or disagreement with the opinion by casting of a vote. Accordingly, graphical user interface 500 includes a control 520 through which Mary could express agreement with the opinion represented by item 514. Control 522 may be used to express disagreement. Control 524 may be used if Mary does not wish to express agreement or disagreement with John's opinion. Though, any suitable user interface elements may be used to obtain input relating to agreement or disagreement with the opinion.

For example, FIG. 5 illustrates an example of a system in which approval or disapproval is expressed in a way that provides two binary choices. Other controls may be used to express approval in other forms. For example, a control in the form of control 452 could be used to receive an expression of agreement or disagreement. Moreover, it is not a requirement that an input expressing affinity be collected as an express indication of approval or disapproval. In some embodiments, a correlation between opinions expressed by two members may be used to generate a metric of affinity. In the example of FIG. 5, rather than presenting a user interface directly querying Mary for approval or disapproval about John, vote-tracking sub-module 209 (FIG. 2A) may query Mary for an opinion about a restaurant that John has rated. A higher affinity may be recorded if the opinions coincide and a lower affinity if they diverge.

Regardless of the format in which the input is received, vote tracking sub-module 209 (FIG. 2A) may use the input provided through one of control's 520, 522 or 524 to develop a value of an affinity metric. In some embodiments, inputs on multiple opinions may be aggregated into a single value of an affinity metric. For example, vote tracking sub-module 209 may track agreement on an individual recommendation by recommendation basis. However, in some embodiments, agreement or disagreement may be tracked based on a higher level categorization of opinions. For example, the system may develop values of approval for a member's opinions in certain categories, such as restaurants, sports or politics. In such an embodiment, expressions of agreement or disagreement may be aggregated based on category. Though, it should be appreciated that it is not necessary that expressions of agreement be aggregated in accordance with specific categories.

Based on the opinions of multiple members, which may be collected through graphical user interfaces such as those illustrated in FIGS. 4A and 4B, and votes, such as may be obtained through graphical user interface such as that illustrated in FIG. 5, clustering and tagging sub-module 210 (FIG. 2A) may generate clusters. These clusters may be used in any suitable way. Once formed, these clusters may be used for tagging members of the social network.

Figure 6:
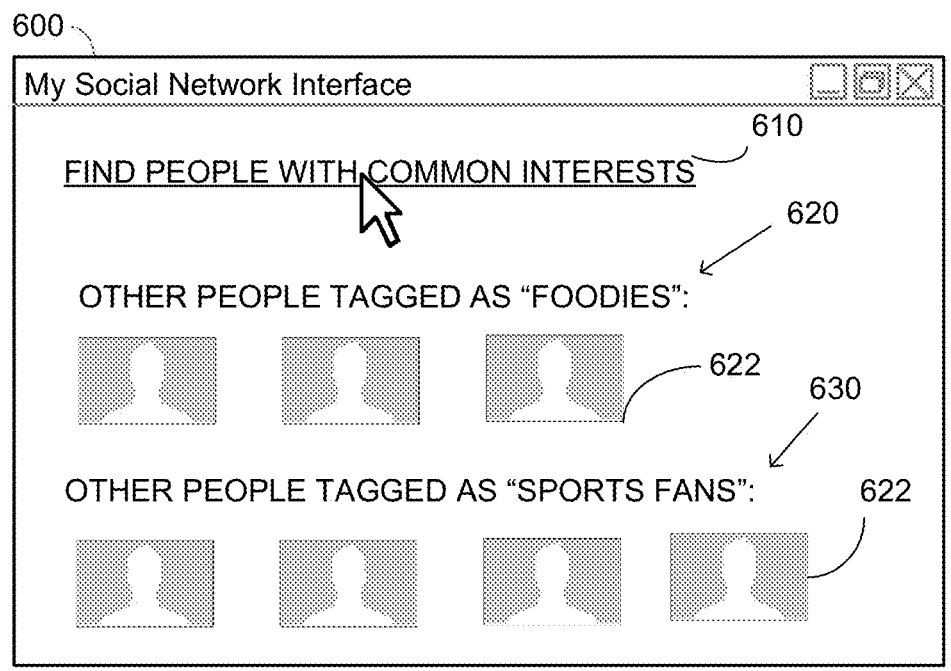
FIG. 6 is a sketch of a graphical user interface through which a user may receive a personalized recommendation based on clusters of members identified by a computing device facilitating a social network.

FIG. 6 illustrates a graphical user interface 600 through which a member of social network 100 may access information about other members that have been assigned to clusters. In this example, the clusters are overlapping and have been tagged. The assigned tags, in this example, have semantic meaning. Specifically, graphical user interface 600 displays other members of the social network that have been assigned to clusters to which tags "foodies" and "sports fans" have been assigned.

FIG. 6 illustrates that a user interacting with a server implementing the social network may request information about other members of the social network based on clusters to which those members have been assigned. In this example, user interface 600 includes a control element 610 through which a user may request that the social network system identify other members with interests in common with the user. Accordingly, activation of control element 610 may trigger the social network system to process a data set containing data about other members of a social network. Though it should be appreciated that in some embodiments, the data set may be processed in advance such that activating control element 610 causes the social network system to access previously processed information.

Regardless of when a data set is processed, that processing may, using techniques as described herein, form clusters of members of the social network. In this example, clusters containing the user interacting with the social network system through user interface 600 are identified.

In the scenario illustrated in FIG. 6, forming clusters as described herein resulted in the user interacting with the social network system through graphical user interface 600 being assigned to a cluster that has been tagged as "foodies" and being assigned to a cluster tagged as "sports fan." Other members similarly assigned to the cluster that has been tagged "foodies" are displayed in display area 620. Other members of the social network that have been assigned to the cluster tagged "sports fans" are displayed in display area 630.

It should be appreciated that graphical user interface 600 shows three members in display area 620 and four members in display are a 630. These numbers of members are shown for simplicity. It should be appreciated that a cluster may contain any number of members. When more members are contained in a cluster than can conveniently be displayed, filtering techniques may be used to reduce the number displayed. Alternatively or additionally, display techniques may be used to display subsets of the members in a cluster at any one time such that information presented can fit on a computer screen. However, for simplicity, express description has been omitted of techniques for limiting the number of members displayed.

In this example, two clusters of which the user is a member are illustrated. Those clusters are tagged with tags having semantic meaning. The tags may be associated with the clusters in any suitable way. For example, tags may be assigned by one or more members of the social network after the clusters are identified. Alternatively or additionally, tags may be applied by an employee of the company operating the social network system. As yet a further example, the tags may be applied automatically by analyzing characteristics of the members assigned to each cluster. Such characteristics may be self-assigned by members or may be automatically assigned by the social network system based on inputs or other interactions of the members. Accordingly, it should be appreciated that the specific techniques used to generate the tags is not critical to the invention. In some embodiments, clusters may be presented without any tags.

FIG. 6 illustrates a further feature that may result from forming clusters of potentially overlapping subsets of items in a data set. In this example, the items in the data set are the members of the social network. The subsets, the tagged clusters in the examples of FIG. 6, contain overlapping membership. As one example, FIG. 6 shows clusters in which the user interacting with the social network system is a member.

Therefore, the user is assigned to both the cluster represented in display area 620 and the cluster represented in display are 630. The clusters overlap at least because both contain the user. Though it should be appreciated that there may be any suitable number of overlapping members in the clusters. For example, icon 622 in display area 620 represents a specific member of the social network. Display area 630 similarly contains icon 622, indicating that the same member has been assigned to both the cluster represented in display area 620 and in the display area 630.

In the example of FIG. 6, assignment of a member represented by icon 622 into two clusters indicates that the member has multiple interests. The simplistic example of FIG. 6 illustrates that using overlapping clusters, rather than partitions of the data set representing members of the social network, may lead to outputs that more readily correspond to expectations of the users of the social network system. For example, it can be seen that a single member may have interests in fine dining as well as sports such that some members are appropriately classified in the cluster represented in display area 620 and in the cluster represented in display area 630. By allowing one member to appear in both clusters, the end result is a more accurate representation of the members of the social network.

Figure 7:
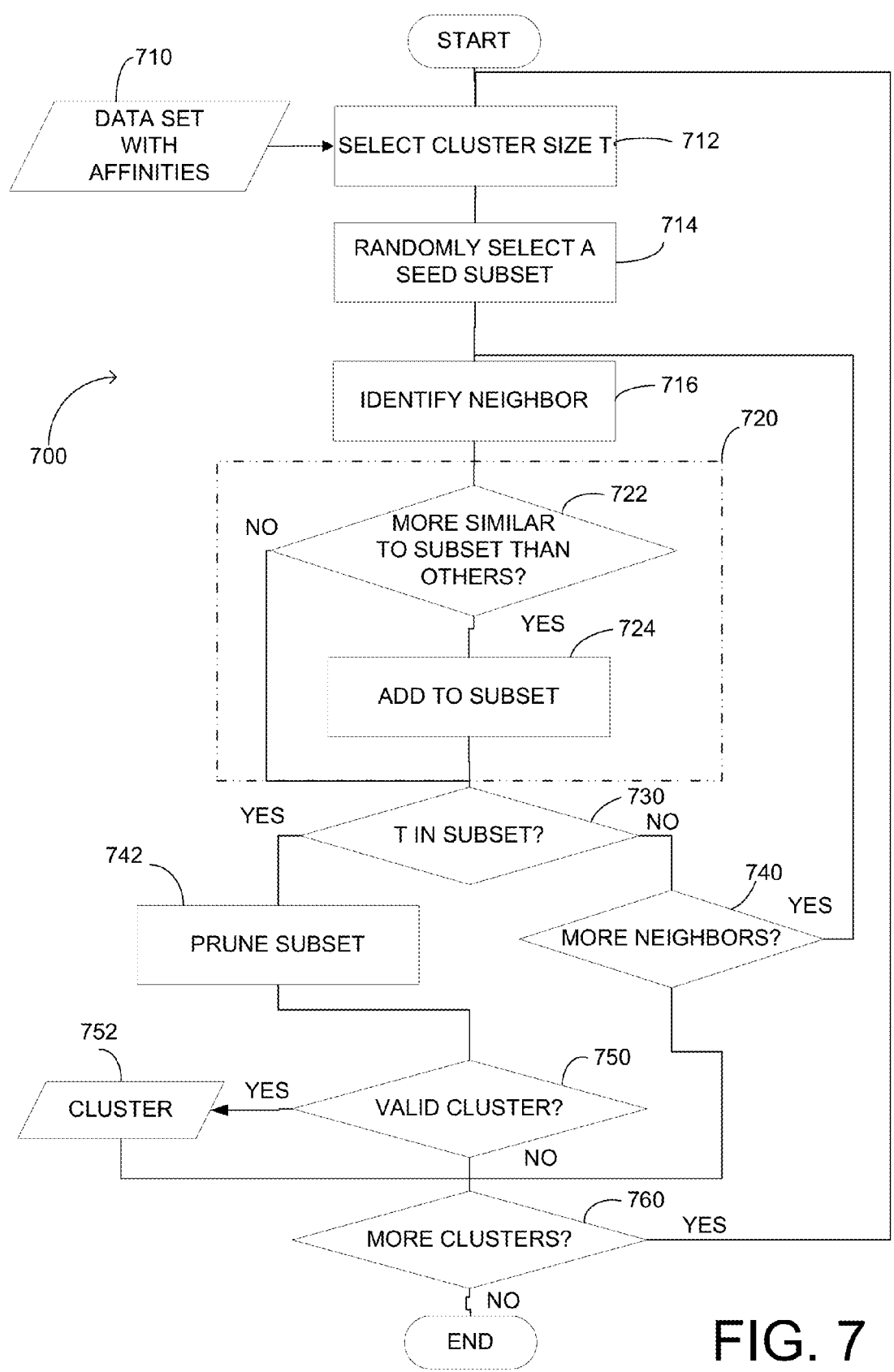
FIG. 7 is a flow chart of an exemplary method of forming clusters of members of a social network.

Clusters may be formed in any suitable way. FIG. 7 illustrates a method 700 that may be performed to segregate a data set into one or more, potentially overlapping clusters. In this example, methods 700 begins with a data set 710. The data set 710 has been processed such that it includes information about degrees of relatedness of the items in the data set. Those degrees of relatedness may be expressed in any suitable way, including some form of affinity metric indicating similarity of the items in the data set. In the example of a social network, the degrees of relatedness may be derived from inputs made by members of a social network. As specific example, the affinities associated with the members in data set 710 may be collected based on postings made by the individual members and votes, showing either agreement or disagreement with those postings made by other members of the social network.

The affinities may be derived as described above in connection with FIG. 5 in which one member inputs an expression of agreement or disagreement with a posting made by another member. In some embodiments, these expressions of agreement or disagreement may be converted to a numeric indication of affinity. The numeric indication of affinity, for example, may be computed as a percentage of the time that one member expresses agreement for an opinion posted by another member. As another example, a numeric value may be determined based on an average rating applied by one member to items associated with another. As a specific example, the numeric value of affinity may be derived by computing the average number of stars that one user assigns to the opinions of another member. Though, it should be appreciated that the specific mechanism by which user input is converted to an affinity metric may depend on the nature of the interface through which those expressions of agreement or disagreement are provided.

Regardless of the manner in which values representing affinities are collected, method 700 may proceed to block 712. At block 712 a size T for clusters is selected. The numeric value of the size T is not critical to the invention and may be selected based on the data set or the intended use of the clusters. The value of the size T may depend on a priori information about the data set or the clusters. As a specific example, in a social network with a thousand members for which it is expected that there are approximately ten clusters, the size T may be selected to be on the order of 100.

As another example, the size T may be selected to yield clusters that are interesting in the context for which clusters are being formed. The size T may be selected to be large enough to provide useful clusters. However, the size T may be selected to be small enough that clusters of that size are likely to exist in the data set such that processing is not wasted attempting to identify clusters of a size that do not exist.

Method 700 may then proceed to block 714. At block 714, one or more members of the data set may be selected as a seed for a subset. In some embodiments, the selection may be based on characteristics of the members. For example, in a scenario in which members having a specific characteristic is desired, selection of the seed at block 714 may entail selecting one or more members of the data set having the desired characteristic. In other embodiments, the seed selected at block 714 may be an item in the dataset about which information has been requested by a user or some other process. Such an approach may be useful, for example, in an embodiment in which the objective of performing the method 700 is to identify all of the clusters to which a particular item belongs. However, in the embodiment illustrated in FIG. 7, the method 700 may identify clusters without advance knowledge of the existence of any particular type of cluster. In such an embodiment, processing at block 714 may entail randomly selecting a member of the data set to act as a seed for a subset.

Regardless of the manner in which the seed subset is selected at block 714, processing may proceed to block 716. At block 716, a candidate item for addition to the subset is selected. In this example, a candidate items is selected by identifying a neighbor of the seed item. In this context, a neighbor refers to another item in the data set that has a high affinity to the items selected as a seed for the subset. Such a neighbor may be identified in any suitable way. For example, the items in the data set 710 may be represented as a graph, with each node in the graph representing an item in the data set. The affinity for one item to another may be represented by edges in the graph between the nodes representing those items. Items with high affinity will be positioned in the graph with close spacing, whereas items with a relatively low affinity will be more widely separated. Accordingly identifying a neighbor at block 716 may entail identifying a node in the graph close to the node representing the seed item selected at block 714. Known techniques for finding neighboring nodes in a graph or other data set may be used to identify a neighbor at block 716. Though, it should be appreciated that any suitable technique for selecting another item with high affinity may be employed.

Regardless of the manner in which a neighbor is identified, method 700 may proceed to subprocess 720. In subprocess 720, a determination may be made whether to add the identified neighbor to the subset. Subprocess 720 includes decision block 722. At decision 722, subprocess 720 branches, depending on whether the neighbor identified at block 716 is more similar to items in the subset being processed than it is to other items in the data set that have not been assigned to the subset. In the first iteration of method 700, the neighbor identified at block 716 will be compared to the seed selected at block 714. In subsequent iterations, the neighbor identified block 716 will be compared to the subset formed by adding to and, in some embodiments, removing from the subset started by the selecting of a seed at block 714.

Processing at decision block 722 may entail application of any suitable criteria for determining similarity. In some embodiments, the criteria for determining similarity may be applied by computing a value representing values representing a degree of relatedness of the neighbor identified at block 716 to the items in the subset being processed. A separate value, representing a degree of relatedness between the identified neighbor and items of the data set 710 not assigned to the subset, may also be computed. Either or both of these values representing a degree of relatedness may be compared to one or more degree of relatedness criteria.

If the identified neighbor satisfies the degree of relatedness criteria, subprocess 720 may branch from decision block 722 to block 724, where the identified neighbor may be added to the subset. Conversely, if application of the degree of relatedness criteria results in the determination that the identified neighbor is not more similar to items already in the subset than it is to other items in data set 710, subprocess 720 may branch from decision block 722 to the end of subprocess 720, thereby completing subprocess 720 without adding the identified neighbor to the subset.

Any suitable metric may be used to determine degrees of relatedness of the identified neighbor to the subset being processed and to the items in the data set that are not in the subset. In some embodiments, the degree of relatedness criteria may be determined based on the affinities provided for items in the data set 710. A degree of relatedness may be computed, for example, as an average affinity between the identified neighbor and the items within the subset or the items in the data set that have not been assigned to the subset. Though, in other embodiments, different or additional factors may be considered in calculating a degree of relatedness. For example, a degree of relatedness may be computed as a percentage of the items in the subset that have an affinity, greater than a threshold, for the identified neighbor. A degree of relatedness to items outside of the subset may similarly be calculated. Though, it should be recognized that the degree of relatedness to items inside the subset and items outside the subset may be computed in different ways. For example, a different threshold may be used in determining whether an item outside the subset has a sufficient affinity with the identified neighbor to be considered in calculating the degree of relatedness between the identified neighbor and items outside the subset.

The degree of relatedness criteria applied as part of subprocess 720 may be determined in any suitable way. This specific expression of the criteria may depend on the specific metric used for computing degree of relatedness. Moreover, any suitable number of criteria may be applied. For example, the identified neighbor may be added to the subset only when multiple criteria are satisfied. As a specific example, the degree of relatedness may indicate a relatively high degree of relatedness to items already in the subset while simultaneously indicating a relatively low degree of relatedness to items outside the subset. Though, it should be appreciated that any suitable number and type of degree of relatedness criteria may be applied in decision block 722.

Regardless of the manner in which a determination is made whether to add an identified neighbor to the subset being processed, upon completion of the subprocess 720, method 700 may proceed to decision block 730. At decision block 730, method 700 may branch. The method may branch depending on the number of items assigned to the subset following subprocess 720. If the number of items in the subset has not reached the cluster size set at block 712, method 700 may branch from decision block 730 to decision 740. At decision block 740, method 700 may branch, depending on whether further neighbors remain to be processed. If further neighbors remain to be processed, method 700 may loop back from decision block 740 to block 716, where a further neighbor may be selected and processed through subprocess 720, as described above.

Any suitable criteria may be used to determine whether further neighbors remain to be processed. In some embodiments, if additional items exist in data set 710 that have not been selected and considered as candidates for inclusion in the subset being processed, processing may loop back to block 716 for the remaining items in data set 710 to be selected and processed. Though, in some embodiments, restrictions may be placed on which of the items in data set 710 that are considered for inclusion in the subset being processed. Any suitable criteria may be used to determine whether further items exist in data set 710 meeting the criteria of items to be considered for inclusion in the subset being processed. For example, for each subset processed, only items having a common characteristic with the seed selected at block 714 may be considered. As an example, a heuristic applicable to specific scenario in which method 700 is being applied may be used to determine a candidate item. The heuristic, for example, may be based on tags or other properties associated with items that reveal that items are compatible, or conversely are incompatible and should not be included in the same cluster. Alternatively or additionally, additional neighbors may be considered only when they have some threshold amount of relatedness to the items selected as a seed at block 714. As yet a further example of processing at decision block 740, further neighbors may not be considered once some number or some percentage of neighbors previously processed are deemed to be insufficiently related to the items in the subset.

Conversely, when processing at decision block 730 determines that the number of items in the subset being processed equals the size T, method 700 may branch from decision block 730 to block 742. At block 742, the identified subset may be pruned, potentially reducing the number of items in the subset. Pruning at block 742 may account for the fact that the characteristics of the subset may change as each additional item is added to the subset. Accordingly, while each item is added to the subset only if that item is more similar to the items in the subset than to other items, this comparison is made based on the characteristics of the subset at the time the specific item is considered for addition. As a result, some items added to the subset, though they met the degree of relatedness criteria at the time they were added to the subset, may not meet the degree of relatedness criteria at a later time after additional items have been added to the subset. Pruning at block 742 entails removing from the subset any items that do not meet the degree of relatedness criteria at the time of pruning.

Pruning at block 742 may be performed in any suitable way. In some embodiments, pruning at block 742 may entail applying the same degree of relatedness criteria applied at decision block 722. However, rather than comparing an identified neighbor that is not in the subset to the items in the subset, the degree of relatedness criteria may be applied to items already in the subset. Though, it should be appreciated that the items in the subset may be considered in any suitable order, including randomly. However, in some embodiments, the items in the subset may be considered in the order in which they were added to the subset.

Furthermore, each item in the subset may be considered any suitable number of times in conjunction with pruning performed at block 742. In some embodiments, for example, each item in a subset may be considered once as part of the pruning process at block 742. In other embodiments, processing at block 742 may account for the fact that removing an item from the subset further changes the characteristics of the subset. Accordingly, in some embodiments, pruning at block 742 may be repeated until every item in the subset is considered without removing any items from the subset.

Regardless of the order in which the items in the subset are considered as part of block 742, if the item is determined not to meet the degree of relatedness criteria, that item may be removed from the subset.

Once all of the items are considered, method 700 may proceed to decision block 750. At decision block 750, method 700 may branch, depending on whether the remaining items in the subset form a valid cluster. Any suitable criteria may be applied at decision block 750 to determine whether the subset forms a valid cluster. In some embodiments, the validity of a cluster may be determined based on the number of items in the subset remaining after pruning at block 742. This number may be expressed as an absolute number or as a percentage of the data set 710. Alternatively or additionally, the number may be expressed as a percentage of the size T selected at block 712. Though, it should be appreciated that other criteria may alternatively or additionally be applied at block 750 to determine whether the subset remaining after pruning forms a valid cluster. Statistics of the items in the subset, such as their average affinity or variance in affinities among the items in the subset, may be used as indicators of whether the subset forms a valid cluster.

Regardless of the criteria applied at decision block 750, if the subset forms a valid cluster, method 700 may branch from decision block 750 to block 752. At block 752, the subset remaining after pruning may be output as a cluster. In conjunction with outputting a cluster at block 752, a tag may be applied to the cluster. As described above, the tag may be a semantic tag, which may be selected through automated processing of the items in the cluster to identify common characteristics. Alternatively or additionally, the tag applied at block 752 may be a semantic tag selected by a human. Alternatively or additionally, the tag applied at block 752 may have no semantic meaning, other than to indicate that the items of the identified subset form a cluster.

Upon completion of processing of the cluster at block 752, method 700 may proceed to decision block 760. At decision block 760, method 700 may branch, depending on whether additional clusters are to be identified.

If no further neighbors remain for processing at decision block 740, method 700 proceeds from decision block 740 to decision block 760. If processing reaches decision block 760, processing of the subset is completed, and the subset will either have been classified as a cluster or discarded. If processing reaches decision block 760 through decision block 740, the subset being processed is regarded as too small to qualify as a cluster. Accordingly, processing of the subset is completed without deeming the subset being processed as a cluster.

From decision block 760, method 700 may loop back to determine whether further processing should be performed to attempt to identify additional clusters. Any suitable criteria may be applied at decision block 760 to determine whether further subsets should be processed. In some embodiments, processing may continue until a desired number of clusters is identified. The desired number of clusters, for example, may be dictated by the specific system applying method 700. For example, in a social networking system as described above, a determination may be made that a user would regard as useful information on up to five clusters. In that scenario, processing at decision block 760 may result in method 700 looping back to block 712 when less than five clusters have been identified. Though, it should be appreciated that any suitable criteria may be alternatively or additionally be applied at decision block 760. For example, processing at decision block 760 may be based on processing time or number of subsets considered without identifying a valid cluster. Regardless of the criteria applied at decision block 760, if no further clusters are to be identified, method 700 may end. Conversely, if further clusters are to be processed, method 700 may loop back to block 712 where processing on a further subset, potentially representing a cluster, is initiated.

As shown, in each iteration of method 700, a size T may be selected for the cluster. In some embodiments, the size T may be the same for every iteration of method 700. Though, in some embodiments, the size T may be adaptively set. Any suitable criteria may be used to adaptively set the size T in each iteration. The size, for example, may be decreased if processing has failed to identify subsets of items that meet the criteria for a valid cluster in multiple prior iterations of method 700. Conversely, if subsets meeting the cluster criteria were identified in multiple successive iterations of method 700 after processing only a relatively small number of items in the data sets, the size T may be increased. Though, regardless of how the size T is determined, processing may proceed through blocks 714, 716 and subprocess 720 as described above.

Figure 8:
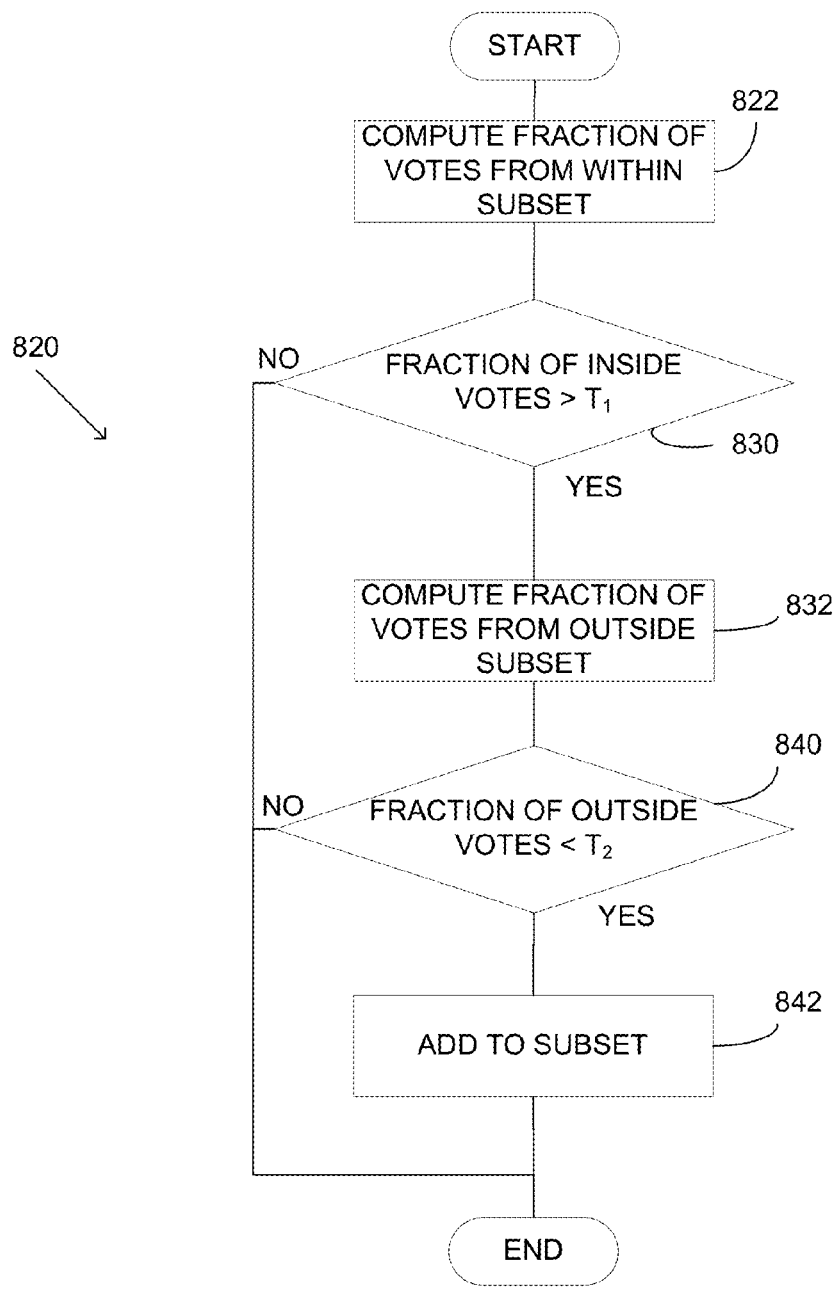
FIG. 8 is a flow chart of an alternative embodiment of sub process 720 (FIG. 7)

FIG. 7 illustrates a possible method for forming clusters. Method 700 includes subprocess 720 for determining whether an identified neighbor is added to a subset being processed to identify potential clusters in a data set 710. FIG. 8 illustrates a subprocess 820 that may be applied instead of subprocess 720. Though, application of subprocess 820, like application of subprocess 720, results in a determination of whether an identified neighbor is added to a subset being processed.

In this example, subprocess begins a block 822. At block 822, a degree of relatedness between the identified neighbor and the subset being processed is computed. In this example, that computation is based on a consideration of indications of approval in the form of votes. In this example, a vote may be a binary indication of approval associated with the identified neighbor. In an embodiment in which the items of a data set being processed are members of social network, a vote may be an indication of approval entered by one member for another. The vote may be expressed directly for the other member. Alternatively or additionally, the vote may be expressed for an object associated with the member. For example, as described above, a vote may be cast for an opinion or other posting made by a member of a social network.

Regardless of the manner in which votes are accumulated and the specific meaning of the votes in the system applying subprocess 820, a degree of relatedness may be computed by determining the fraction of votes cast in favor of the item representing the identified neighbor from items already assigned to the subset being processed.

In the scenario illustrated in FIG. 8, the fraction computed at block 822 may represent the fraction of the items in the subset being processed that cast a vote in favor of the identified neighbor. Though, other computations may be used to determine a value indicating a degree of relatedness. For example, the computation at block 822 may be the fraction of items in the subset casting a vote involving the identified neighbor that indicate approval for the identified neighbor. Such an approach may be appropriate for scenarios in which some members may cast votes of approval or disapproval and other members may cast no vote at all.

Accordingly, it should be appreciated that the manner in which votes are converted into a value indicating a degree of relatedness may depend on the specific system in which subprocess 820 is applied. The manner in which votes are collected, the significance of each vote, and the percentage of items in the data set that cast votes for other items may all impact the specific computation used at block 822. Accordingly, the specific computation performed at block 822 is not critical to the invention. Nonetheless, the computation performed at block 822 may indicate an aggregate approval of the identified neighbor from within the subset being processed. Accordingly, this value may be used as part of a criteria for determining whether the identified neighbor is added to the subset.

At block 830, the subprocess 820 branches, depending on whether the value computed at block 822 indicates a sufficiently high degree of relatedness for the identified neighbor. If the fraction computed at block 822 is not greater than some threshold, here indicated as threshold $T_1$, subprocess 820 may branch from decision block 830 to the end. If subprocess 820 branches to the end from decision block 830, subprocess 820 ends without the identified neighbor being added to the subset. Accordingly, the threshold $T_1$ represents the minimum degree of relatedness for addition of an identified neighbor to the subset.

In the embodiment illustrated in FIG. 8, even if the identified neighbor meets the minimum relatedness criteria applied at decision block 830, subprocess 820 may continue with the application of additional criteria. Accordingly, FIG. 8 shows that, when the degree of relatedness criteria applied at decision block 830 is met, subprocess 820 continues to block 832, where one or more additional criteria may be applied.

As an example of additional criteria, at block 832 a further degree of relatedness criteria may be computed. As a specific example, FIG. 8 shows that the degree of relatedness criteria represents a relatedness of the identified neighbor to items not in the subset. In this example, the degree of relatedness criteria is computed as a fraction of votes for the identified neighbor from items in the data set that are outside of the subset being processed. As discussed above in connection with block 822, this fraction may be computed in any suitable way. For example, the fraction may represent the fraction of all votes cast for the identified neighbor that are cast by items outside of the subset being processed. Alternatively or additionally, the value computed at block 832 may be based on the percentage of items outside of the subset casting a vote for the identified neighbor that are favorable. As yet a further example, the value computed at block 832 may represent the fraction of items outside of the subset that cast a vote for the identified neighbor that indicates approval for the identified neighbor. Such an approach may be appropriate, for example, when the system supports votes that indicate approval, votes that indicate disapproval, and also allows items in the data set without providing a vote of either approval or disapproval for other items in the data set. FIG. 8 shows that processing at block 832 and at decision block 840 is optional. Accordingly, it should be appreciated that such processing is not a requirement of the invention.

Regardless of the specific computation performed at block 832, subprocess 820 may proceed to decision block 840, where the process may branch depending on the value computed. In this example, processing at decision block 840 determines whether the identified neighbor has a high degree of affinity for items that are not included in the subset being processed. A neighbor may be added to the subset when processing at decision block 830 indicates a high level of affinity for items in the subset and when there is not a high level of affinity for items outside of the subset. In this example, an identified neighbor is deemed to not have a high level of affinity for items outside the subset when the fraction computed at block 832 is less than some threshold $T_2$. As with threshold $T_1$ applied at decision block 830, the threshold $T_2$ applied at decision block 840 may be determined in any suitable way. In some embodiments, the threshold $T_1$ and the threshold $T_2$ may have the same value. However, in other embodiments, the thresholds $T_1$ and $T_2$ may have different values.

In some embodiments, the thresholds may be selected to control the characteristics of the subsets that qualify as valid clusters. A higher value of threshold $T_1$ and/or a lower value of threshold $T_2$ increases the degree of relatedness of items assigned to the subset being processed. Setting the thresholds $T_1$ and $T_2$ in this way may result in the items in identified clusters being highly related or, with other settings, more loosely related. As a specific example, threshold $T_1$ may be set to a value greater than 60%, indicating that the average approval from items within the subset must be greater than 60% in order to add an item to the subset. In contrast, the threshold $T_2$ may be selected to be less than 40%, indicating that an item will not be added to the subset if 40% or more of the items outside the subset express approval for that item. Though, it should be recognized that the specific values of thresholds $T_1$ and $T_2$ may depend on the system in which subprocess 820 is applied, including the specific computations used at blocks 822 and 832 to compute a value representing approval for an identified neighbor from items within the subset and items outside of the subset.

Regardless of the manner in which these thresholds are determined, if the identified neighbor meets the criteria applied at decision block 830 and meets the criteria applied at decision block 840, subprocess 820 will pass to block 842, where the identified neighbor is added to the subset. Conversely, if the identified neighbor does not meet the criteria applied at either decision block 840 or decision block 830, subprocess 820 will branch to the end without the identified neighbor being added to the subset. In this way, items in the data set may be iteratively processed to identify a subset of related items which may, if the subset meets criteria for a valid cluster, be identified as a cluster.

Such an approach may be applied in any suitable setting, including as part of a social network in which users of the social network cast votes of approval or disapproval for opinions or other postings of other users. In this way, the votes of approval or disapproval serve as a source of relatedness information that can be used to automatically form clusters of users of the social network system. Such an approach may be computationally simple, allowing clusters to be identified in polynomial time. Moreover, the approach represented by method 700 and subprocess 820 may be shown, mathematically, to identify clusters in a data set with a confidence that can be computed mathematically. What follows is a demonstration of the described approach for forming clusters. Though, it should be appreciated that operation according to the following theories are not a requirement of the invention. In particular, the assumptions presented below are not limitations on the invention. Additionally, it should be recognized that, though the following theories may relate to a preferred implementation, all of the claims are not necessarily limited to these preferred implementations.

In some scenarios, it may be useful to employ a technique for forming clusters for which processing may be known to be bounded and for which the probability of identifying relevant clusters can be demonstrated to be very high. While not being bound by any particular theory of operation of a system as described herein, the following sections indicate that techniques as described herein can be shown to require a finite amount of processing to identify all relevant clusters.

In our most basic model, we consider an affinity system with n members $V=\{1, \ldots, n\}$ and assume that each member i states a strict ranking $\pi_i$ of all members in the order of her preferences. Let $\Pi=\{\pi_1, \ldots, \pi_n\}$. For $t>0$, $S \subseteq V$ we denote by $v_S^t(i)$ the number of members in S that place i among the topmost t elements of their preference list. That is $v_S^t(i)=|\{s \in S | i \in \pi_s(1:t)\}|$. For $\theta>0$, we let $\phi_S^\theta(i):=v_S^{\lceil \theta|S| \rceil}(i)$. We define a natural notion of a cluster developed by votes indicating affinity by one member for another member, referred to herein as self-determined community, as follows:

Definition 1 Given three positive parameters $\theta, \alpha, \beta$, where $\beta < \alpha \leq 1$ and an affinity system (V,$\Pi$) we say that a subset S of V is an $(\theta, \alpha, \beta)$ self-determined community with respect to (V,$\Pi$) if we have both
1. For all $i \in S$, $\phi_S^\theta(i) \geq \alpha|S|$
2. For all $j \notin S$, $\phi_S^\theta(j) \leq \beta|S|$ Here, $\gamma = \alpha - \beta$. Fixing $\theta$, we say that "i votes for j with respect to a subset S" if $j \in \pi_i(1:\lceil \theta|S| \rceil)$. When S is clear from the context we say that i votes for j.

Note that communities may overlap. As a simple example, assume we have two sets $A_1$ and $A_2$ of size n/2 with n/8 nodes in common (representing, say, researchers in Algorithms and researchers in Complexity). Assume each node in $A_i \backslash A_j$ ranks first the nodes in $A_i$ and then the nodes in $A_j$ and that each node in $A_i \cap A_j$ ranks the nodes in $A_i \cup A_j$ arbitrarily. Then each A is a (1,¾,¼) self-determined community.

We also consider (more general) weighted affinity systems, where the preferences of each member s involve numerical weightings (degrees of affinity) rather than just an ordinal ranking. A weighted affinity system is expressed as A={V, $a_1, \ldots a_n$}, where $a_i$ is a n-dimensional vector $a_i = (a_{i,1}, \ldots, a_{i,n})$ and $0 \leq a_{i,j} \leq 1$ specifies the degree of affinity that i has for j. For example, i may give her top-ranked node a weight of 1, she might have a tie between its second and third-ranked nodes giving both a weight of 0.7, and so on. If member i chooses not to vote for a given node, this can be modeled by giving that node a weight of 0.

One can naturally define $(\theta,\alpha,\beta)$-self-determined communities for weighted affinity systems. When voting for a community of size t, i can cast a total fractional votes $\theta t$ in the order of her preference according to the weights. More precisely, to evaluate whether a subset S is good community, imagine that each member $i \in S$ casts a weighted vote as follows: i determines a prefix of the weights (sorted from highest to lowest) of total value $\theta|S|$ and zeros out the rest. If there are ties at the boundary, the natural conversion is simply to scale down the weights of those nodes just at the boundary to make the sum exactly equal to $\theta|S|$. Call the resulting vector $a_s^{\theta|S|}$. The amount of the weight that member $i \in V$ receives from S is $a_S^\theta(i) = \Sigma_{s \in S} a_{s,i}^{\theta|S|}$.

Definition 2 Given $\theta, \alpha, \beta \geq 0$, $\beta < \alpha \leq 1$ and an weighted affinity system (V,A) we say that a subset S of V is an $(\theta, \alpha, \beta)$ weighted self-determined community with respect to (V,A) if we have both
1. For all $i \in S$, $a_S^\theta(i) \geq \alpha|S|$.
2. For all $j \notin S$, $a_S^\theta(j) \leq \beta|S|$.

We note that given an (weighted) affinity system and a set S we can test in time polynomial in n whether a proposed set S is a $(\theta,\alpha,\beta)$-self-determined community or not. Also, fixing a $(\theta,\alpha,\beta)$-self-determined community S, one can easily show that there exists a multiset U of size $k(\gamma)=2 \log(4n)/\gamma^2$ such that the set of elements i voted by at least a $(\alpha-\gamma/2)$ fraction of U (or in the weighted case, the set of elements i receiving $(\alpha-\gamma/2)|U|$ total vote from U) is identical to S. This then implies a very simple quasi-polynomial procedure for finding all self-determined communities, as well as an $n^{O(\log n/\gamma^2)}$ upper bound on the number of $(\theta,\alpha,\beta)$-self-determined communities.

A multi-stage approach for finding an unknown community in an affinity system is believed to provide much better guarantees for interesting settings of the parameters. At a generic level, this algorithm takes as input information I about an unknown community S and outputs a list $\lfloor$ of subsets of V s.t. if information I is correct with respect to S, then with high probability $\lfloor$ contains S. This algorithm has two main steps: it first generates a list $\lfloor_1$ of sets $S_1$ s.t. at least one of the elements in $\lfloor_1$ is a rough approximation to S in the sense that $S_1$ nearly contains S and it is not much larger than S. In the second step, it runs a purification procedure to generate a list $\lfloor$ that contains S. (See Algorithm 1). Both steps may be performed by exploiting properties of self-determined communities and we will describe in detail in the following sections ways to implement both steps of this generic scheme. We also discuss how to adapt this scheme for outputting a self-determined community in a local manner, for enumerating all self-determined communities, as well as extensions to multi-facet affinity systems and applications of our analysis to social networks.

Algorithm 1: A generic algorithm for identifying unknown community S
  Input: Preference system (V,$\Pi$), information I about unknown community S.
    1. Using information I to generate a list $\lfloor_1$ of sets $S_1$ s.t. at least one of the elements in $\lfloor_1$ is a rough approximation to S.
    2. Run a purification procedure to generate a list $\lfloor$ s.t. at least one of the elements in $\lfloor$ is identical to S.
    3. Remove from the list $\lfloor$ all the sets that are not self-determined communities.
  Output: List of self-determined communities $\lfloor$.

Finding Self-Determined Communities

In some embodiments, the generic Algorithm 1 can be instantiated if the information we are given about the unknown community S is its size and the parameters $\theta$, $\alpha$, and $\beta$. We show that this leads to a polynomial time algorithm in the case where $\theta$, $\alpha$, and $\beta$ are constant. We start with a structural result showing that for any self-determined community S there exist a small number of community members s.t. the union of their votes contains almost all S.

Lemma 1 Let S be a $(\theta,\alpha,\beta)$-self-determined community. Let $\gamma = \alpha - \beta$,
$M = \log(16/\gamma)/\alpha$. There exists a set U, $|U| \leq M$ s.t. the set $S_1 = \{i \in V | \exists s \in U, i \in \pi_s(1:\theta|S|)\}$ satisfies $|S \backslash S_1| \leq (1-\gamma/16)|S|$.

Proof: Note that any subset $\tilde{S}$ of S receives a total of at least $\alpha|\tilde{S}||S|$ votes from elements of S, which implies that for any such $\tilde{S}$ there exists $i_{\tilde{S}} \in S$ that votes for at least $\alpha|\tilde{S}|$ members of $\tilde{S}$. Given this, we find the desired elements $i_1, \ldots, i_M \in S$ greedily one by one. Formally, let $S_1 = S$. Let $i_1 \in S$ be an element that votes for at least $\alpha|S_1|$ elements in $S_1$. Let $S_2$ be the set S minus the set of elements voted by $i_1$. In general, at step $l \geq 2$, there exists $i_l \in S$ that votes by at least a $\alpha$ fraction of $S_l$. Let $S_{l+1}$ be the set $S_l$ minus the set of elements voted by $i_l$. We clearly have $|S_{l+1}| \leq (1-\alpha)^l |S_1|$, so $|S_{M+1}| \leq (\gamma/16)|S_1|$ for $M = \log(16/\gamma)/\alpha$. By construction the set $U = \{i_1, \ldots, i_M \in S\}$ satisfies the desired condition.

Given Lemma 1, we can use the following procedure for generating a list that contains a rough approximation to S which covers at least a $1-\gamma/16$ fraction of S and whose size is at most $\log(16/\gamma)|S|$.

Algorithm 2: Generate rough approximations
  Input: Preference system (V,$\Pi$), information I (parameters $\theta$, $\alpha$, $\beta$, size t).
    1. Set $\lfloor = \emptyset$, $\gamma = \beta - \alpha$, $k_1(\theta,\alpha,\gamma) = \log(16/\gamma)/\alpha$.
    2. Exhaustively search over all subsets U of V of size $k_1(\theta,\alpha,\gamma)$; for each set U add to the list $\lfloor$ the set $S_1 \subseteq V$ of points voted by at least an element in U (i.e., $S_1=\{i \in V | \exists s \in U, i \in \gamma \pi_s(1:\theta t)\}$).

Output: List of sets $\lfloor$.

We now describe a lemma that will be useful for analyzing the purification step, suggesting how we convert a rough approximation to S into a list of candidate much-closer approximations to S.

Lemma 2 Fix a $(\theta,\alpha,\beta)$-self-determined community S. Let $\gamma=\alpha-\beta$, $t=|S|$, and $S_1 \subseteq V$, $|S_1|=M\theta t$ s.t. $|S \setminus S_1| \leq \gamma t/16$. Let U be a set of k points drawn uniformly at random from $\tilde{S}=S \cap S_1$. Let $S_2$ be the subset of points in $S_1$ that are voted by an at least $\alpha-\gamma/2$ fraction of nodes in U, i.e., $S_2=\{i \in S_1 | v_U^{\theta t}(i) \geq (\alpha-\gamma/2)|U|\}$. If $k=8\log(32\theta M/\delta\gamma)/\gamma^2$, then with probability $\geq 1-\delta$, we have $|\Delta(S_2,S)| \leq \gamma t/8$.

Proof: We start by showing that the points in $\tilde{S}$ are voted by at least a $\gamma/2$ larger fraction of $\tilde{S}$ than the points in $S_1 \setminus \tilde{S}$. Let $i \in \tilde{S}$. Since S is $(\theta,\alpha,\beta)$-self-determined, at least $\alpha t$ points in S vote for i and since $|S \setminus \tilde{S}| \gamma t/16$ we get that at least $(\alpha-\gamma/16)t$ points in $\tilde{S}$ vote for i. Since $|\tilde{S}| \leq t$, we obtain that at least a $\alpha-\gamma/16$ fraction of points in $\tilde{S}$ vote for i. Let j be a point in $S_1 \setminus S$. We know that at most $\beta t$ points in $\tilde{S}$ vote for j and since $|\tilde{S}| \geq (1-\gamma/16)t$, we have that at most a $\alpha-3\gamma/4$ fraction of points in $\tilde{S}$ vote for j.

Fix $i \in S_1$. By Hoeffding's inequality, since U is a set of 8 $\log(32\theta M/\delta\gamma)/\gamma^2$ points drawn uniformly at random from $\tilde{S}$ we have that with probability at least $1-\gamma\delta t/(16\theta M)$ the fraction of points in $\tilde{S}$ that vote for i is within $\gamma/4$ of the fraction of points in U that vote for i. These together with the above observations imply that the expected size of $|\Delta(S_2,\tilde{S})|$ is $(\gamma\delta/(16\theta M))\theta Mt=\gamma\delta t/16$. By Markov's inequality we obtain that there is at most a $\delta$ chance that $|\Delta(S_2,\tilde{S})| \geq \gamma t/16$. Using the fact $|\tilde{S} \setminus S| \leq \gamma t/16$ we finally get that with probability $1-\delta$ we have $|\Delta(S_2,S)| \leq \gamma t/8$.

Algorithm 3: Purification procedure

Input: Preference system $(V,\Pi)$, information I (parameters $\theta$, $\alpha$, $\beta$, $\gamma$, $k_2(\theta,\alpha,\gamma)$, $N_2(\theta,\alpha,\gamma)$, size t), list of rough approximations $\lfloor_1$.

1. For each element $S_1 \in \lfloor_1$, repeat $N_2(\theta,\alpha,\gamma)$ times
   (a) Sample a set $U_2$ of $k_2(\theta,\alpha,\gamma)$ points at random from $S_1$. Let $S_2=\{i \in S_1 | v_{U_2}^{\theta t}(i) \geq (\alpha-\gamma/2)|U_2|\}$.
   (b) Let $S_3=\{i \in V | v_{U_2}^{\theta t}(i) \geq (\alpha-\gamma/2)|S_2|\}$. Add $S_3$ to the list $\lfloor$.

Output: List of sets $\lfloor$.

We now show how Lemmas 1 and 2 can be used to identify and enumerate communities.

Theorem 1 Fix a $(\theta,\alpha,\beta)$-self-determined community S. Let $\gamma=\alpha-\beta$, $k_1(\theta,\alpha,\gamma)=\log(16/\gamma)/\alpha$, $$k_2(\theta, \alpha, \gamma) = \frac{8}{\gamma^2} \log\left(\frac{32\theta k_1}{\gamma\delta}\right),$$

$N_2(\theta,\alpha,\gamma)=O((\theta k_1)^{k_2} \log(1/\delta))$. Using Algorithm 2 together with Algorithm 3 for steps (1) and (2) of Algorithm 1, we have that with probability $\geq 1-\delta$ one of the elements in the list $\lfloor$ we output is identical to S.

Proof: Since when running Algorithm 2 we search over all subsets of U of V of size $k_1(\theta,\alpha,\gamma)$, by Lemma 1 in one of the rounds we find a set U s.t. the set of points $S_1$ that are voted by at least an element in U cover a $1-\gamma/16$ fraction of S. So, $\lfloor_1$ contains a rough approximation to S.

Since $|S|=t$, $U_2$ is a set of $k_2$ elements drawn at random from $\tilde{S}=S \cap S_1$ with probability $\geq (t/(2t\theta k_1))^{k_2}$. Therefore for $N_2=O((2\theta k_1)^{k_2} \log(1/\delta))$, with probability $\geq 1-\delta/2$ in one of the rounds the set $U_2$ is a set of $k_2$ elements drawn at random from $\tilde{S}$. In such a round, by Lemma 2, with probability $\geq 1-\delta/2$ we get a set $S_2$ such that $|\Delta(S_2,S)| \leq \gamma t/8$. A simple calculation shows that $S_3=S$.

Corollary 1 The number of $(\theta,\alpha,\beta)$-self-determined communities in an affinity system $(V,\Pi)$ satisfies $$B(n) = n^{O(\log(1/\gamma)/\alpha)} \left(\frac{\theta \log(1/\gamma)}{\alpha}\right)^{O\left(\frac{1}{\gamma^2} \log\left(\frac{\theta \log(1/\gamma)}{\alpha\gamma}\right)\right)}$$

and with probability $\geq 1-1/n$ we can find all of them in time $B(n)$poly(n).

We note that Theorem 1 and Corollary 1 apply even if some nodes do not list all members of V in their preference lists, and then some nodes in a community S have fewer than $\theta|S|$ votes in total. If $\theta$, $\alpha$, and $\beta$ are constant, then Corollary 1 shows that the number of communities is $O(n^{\log(1/\gamma)/\alpha})$ which is polynomial in n and they can be found in polynomial time. We can show that the dependence on $n^{1/\alpha}$ is necessary:

Theorem 2 For any constant $\theta \geq 1$ for any $\alpha \geq 2\sqrt{\theta}/n^{1/4}$, there exists an instance such that the number of $(\theta,\alpha,\beta)$-self-determined communities with $\alpha-\beta=\gamma=\alpha/2$ is $n^{\Omega(1/\alpha)}$.

Proof Sketch: Consider $\lfloor=\sqrt{n}$ blobs $B_1, \ldots, B_L$ each of size $\sqrt{n}$. Assume that each point ranks the points inside its blob first (in an arbitrary order) and it then ranks the points outside its blob randomly. One can show that with non-zero probability for $1 \leq n^{1/4}/(2\sqrt{\theta})$ any union of l blobs satisfies the $(\theta,\alpha,\beta)$-self-stability property with parameters $\alpha=1/l$ and $\gamma=\alpha/2$.

Self-Determined Communities in Weighted Affinity Systems

We provide here a simple reduction from the weighted case to the non-weighted case.

Theorem 3 Given a weighted affinity system $(V,A)$, $\theta,\alpha,\beta$, $\epsilon<\alpha$, and a community size t, there is an efficient procedure that constructs a non-weighted instance $(V',\Pi)$ along with a mapping f from V' to V, s.t. for any $(\theta,\alpha,\beta)$ community S in V there exists a $(\theta,\alpha-\epsilon,\beta)$ community S' in $(V',\Pi)$ with $f(S')=S$.

Proof: Given the original weighted instance $(V,A)$, we construct a non-weighted instance $(V',\Pi)$ as follows. For each $s \in V$, we create a blob $B_s$ of k nodes in V'. For any $s, \tilde{s} \in V$, if p is the weight $a_{s,\tilde{s}}^{\theta t}$ with which s votes for $\tilde{s}$, we connect $B_s$ to $B_{\tilde{s}}$ with $G_{k,k,\lfloor pk \rfloor}$, where $G_{k,k,\lfloor pk \rfloor}$ is a bipartite graph with k nodes on the left and k nodes on the right such that each edge on the left has out-degree $\lfloor pk \rfloor$ and each node on the right has in-degree $\lfloor pk \rfloor$. Clearly all nodes in V' rank at most $k|S|\theta$ other nodes (and do not have an opinion about the rest). Let $k=1/\epsilon$. Consider a community S in $(V,A)$. For any $s \in S$ and for each node in $i \in B_s$ the total vote from nodes in $B_{\tilde{s}}$ for $\tilde{s} \in S$ (when evaluating whether $\cup_{\tilde{s} \in S} B_{\tilde{s}}$ is a good community or not) is at least $\alpha|S|k-|S| \geq k|S|(\alpha-\epsilon)$. Moreover, for $s \notin S$ and for each node in $B_s$ we have the total vote from the nodes in $B_{\tilde{s}}$ for $\tilde{s} \in S$ is at most $\beta|S|k$. Therefore $\cup_{\tilde{s} \in S} B_{\tilde{s}}$ is a legal $(\theta,\alpha-\epsilon,\beta)$-self-determined community of size kt in the non-weighted instance $(V',A)$.

Theorem 4 For any $\theta$, $\alpha$, $\beta$, $\gamma=\alpha-\beta$, the number of weighted $(\theta,\alpha,\beta)$-self-determined communities is $$B(n) = (n/\gamma)^{O(\log(1/\gamma)/\alpha)} \left(\frac{2\theta\log(1/\gamma)}{\alpha}\right)^{O\left(\frac{1}{\gamma^2} \log\left(\frac{\theta \log(1/\gamma)}{\alpha\gamma}\right)\right)}$$

and we can find them in time $B(n)$poly(n).

Proof: We perform the reduction in theorem 3 with $\epsilon=\gamma/2$ and use the algorithm in Theorem 1 and the bound in Corollary 1. The proof follows from the fact that the number of vertices in the new instance has increased by only a $2/\gamma$ factor. Each set output on the reduced instance can then be examined on the original weighted affinity system, and kept iff it satisfies the community definition with original parameters.

Finding Communities in Multi-Faceted Affinity Systems

A multi-faceted affinity system is a system where each node may have more than one rankings of other nodes. Suppose that each element i is allowed to have at most f different rankings $\pi_i^1, \ldots, \pi_i^f$. We say that the pair $(S,\psi)$ is a multi-faceted community where $\psi:S\to\{1,\ldots,f\}$, if S is a community where $\psi(i)$ specifies which ranking facet should be used by element i. In other words, as before, let $\phi_{S,\psi}^\theta(i):=|\{s\in S|i\in\pi_s^{\psi(s)}(1:\lceil\theta|S|\rceil)\}|$. Then $(S,\psi)$ is a $(\alpha,\beta,\theta)$-multifaceted community if for all $i\in S$, $\phi_{S,\psi}^\theta(i)\geq\alpha|S|$, and for all $j\notin S$, $\phi_{S,\psi}^\theta(j)<\beta|S|$.

We show that for a bounded f, even though there may be exponentially many functions $\psi$, it is not harder to find multifaceted communities than to find regular communities. Note that all our sampling algorithms can be adapted as follows. Once a representative sample $\{i_1,\ldots,i_k\}$ of the community S is obtained, we can guess the facets $\psi(i_1),\ldots,\psi(i_k)$ while adding a multiplicative $f^k$ factor to the running time. We can thus get the set $S_2$ approximating S in the same way as it is found in Algorithms 2 and 3 while adding a multiplicative factor of $f^{k_1+k_2}$ to the running time. We thus obtain a list $\lfloor$ that for each multi-faceted community $(S,\psi)$ contains set $S_2$ such that $\Delta(S_2,S)<\gamma t/8$. Given $S_2$ we can output S with probability $>f^{-8\log n/\gamma^2}/2$: guess a set $U_2$ of $m=8\log n/\gamma^2$ points in $S_2$; guess a function $\psi_2$ on $U_2$; output S=the set of points that receive at least $(\alpha-\gamma/2)t$ votes according to $(U_2,\psi_2)$. Moreover, a facet structure $\psi'$ can be recovered on S so that $(S,\psi')$ is an $(\alpha-\gamma/4,\beta+\gamma/4,\theta)$-multifaceted community using a combination of linear programming and sampling.

Theorem 5 Let S be an f-faceted $(\alpha,\beta,\theta)$-community. Then there is an algorithm that runs in $O(n^2)$ time and outputs S, as well as a facet structure $\psi'$ on S such that $(S,\psi')$ is an $(\alpha-\gamma/4,\beta+\gamma/4,\theta)$-multifaceted community with probability at least $$(f\cdot n)^{-O(\log(1/\gamma)/\alpha)}\left(\frac{f\cdot\theta\log(1/\gamma)}{\alpha}\right)^{-O\left(\frac{1}{\gamma^2}\log\left(\frac{\theta\log(1/\gamma)}{\alpha\gamma}\right)\right)}f^{-O(\log n/\gamma^2)}.$$

A Local Algorithm for Finding Self-Determined Communities

In some embodiments, a local algorithm for finding a community. Given a single element v and the target community size t, the goal of the algorithm is to output a community S of size t containing v. Let us fix a target community S that we are trying to uncover this way.

We note that we need $\alpha>\frac{1}{2}$ for a local algorithm that uses only one seed to succeed. If $\alpha\leq\frac{1}{2}$ then one may have a valid $(\theta,\alpha,\beta)$-community that is comprised of two disjoint cliques of vertices. In this case, no local algorithm that starts with just one vertex as a seed may uncover both cliques. Therefore we focus on providing a local algorithm for $\alpha>\frac{1}{2}$. Our local algorithm will follow the structure of the generic Algorithm 1. The main technical challenge is to provide a local procedure for producing rough approximations. In general, it is not possible to do so starting from any seed vertex $v\in S$. For example, if v is a super-popular vertex that is voted first by everyone in V, then v will belong to all communities including S, but v would contain no "special information" that would allow one to identify S. However, we will show that a constant fraction of the nodes in S are sufficiently "representative" of S to enable one to recover S.

Let us fix t and $\theta$. For an element v, we let R(v) be a uniformly random element which receives v's vote with these parameters. In other words, $R(v):=$uniform element of $\pi_v(1:\theta\cdot t)$. We start with the main technical claim that enables a local procedure for producing rough approximations.

Lemma 3 Let S be any $(\theta,\alpha,\beta)$-community of size t. Let $\eta:=2\alpha-1>0$. Then there is a subset $T\subseteq S$ such that $|T|\geq\eta t$ and for each pair $v\in T$ and $u\in S$, we have $$Pr[R(R(v))=u]\geq\frac{(\alpha-1/2)/\theta^2}{t}.$$

Proof: For each element $v\in S$ denote by $O_S(v):=\pi_v(1:\theta\cdot t)\cap S$—the elements of S that v votes for, and by $I_S(v):=\{u\in S:v\in\pi_u(1:\theta\cdot t)\}$—the elements of S that vote for v. By the community property we know that $|I_S(v)|\geq\alpha t$ for all $v\in S$. Observe that $\Sigma_{v\in S}|O_S(v)|=\Sigma_{v\in S}|I_S(v)|\geq\alpha t^2$. Hence at least an $\eta$-fraction of v's in S must satisfy $|O_S(v)|\geq t/2$, where $\eta=2\alpha-1$. Let $T:=\{v:|O_S(v)|\geq t/2\}\subseteq S$. For any $v\in T$ and any $u\in S$, we have $|O_S(v)\cap I_S(u)|\geq|O_S(v)|+|I_S(u)|-t\geq(\alpha-\frac{1}{2})\cdot t$. To finish the proof note that $$Pr[R(R(v))=u]\geq Pr[R(v)\in O_S(v)\cap I_S(u)]\cdot\frac{1}{\theta\cdot t}\geq\frac{(\alpha-1/2)\cdot t}{\theta\cdot t}\cdot\frac{1}{\theta\cdot t}=\frac{(\alpha-1/2)/\theta^2}{t}.$$

We call any vertex v in the set T in Lemma 3 a "good seed vertex" for S. Lemma 3 suggests a natural procedure (Algorithm 1) for generating a rough approximation in a local way given a good seed vertex.

Algorithm 4: Generate rough approximations
Input: Preference system (V,Π), information I (parameters $\theta$, $\alpha$, $\beta$, $\gamma$, vertex v, size t).
1. Set $$S_1=\left\{u:Pr[u=R(R(v))]\geq\frac{(\alpha-1/2)/\theta^2}{t}\right\}.$$

Output: List of sets $\lfloor=\{S_1\}$.
Theorem 6 Assume $\alpha>\frac{1}{2}$. Let $$k_2(\theta,\alpha,\gamma)=O\left(\frac{\log(\theta/\delta\gamma(\alpha-1/2))}{\gamma^2}\right),$$

$$N_2(\theta,\alpha,\gamma)=\left(\frac{\theta^2}{\alpha-1/2}\right)^{k_2(\theta,\alpha,\gamma)}\log(1/\delta).$$

Assuming v is a good seed element for a community S, then by using Algorithm 1 together with Algorithm 2 for steps (1) and (2) of Algorithm 3, we have that with probability $\geq 1-\delta$ we will output S.

Proof: It is enough to show that each iteration of the purification algorithm (Algorithm 3) has a probability $$\geq\left(\frac{\alpha-1/2}{\theta^2}\right)^{k_2}$$

to output S. Since v is a good seed element of S, the set $S_1$ produced by Algorithm 4 must contain S. It is easy to see that $|S_1| \le t\theta^2/(\alpha-\frac{1}{2})$. Thus, applying Lemma 2 with $M=\theta/(\alpha-\frac{1}{2})$ we see that if the points of $U_2$ are drawn uniformly from S, then with high probability $S_2$ is $\gamma/8$-close to S, and $S_3=S$. Since conditioned on $U_2 \subseteq S$, $U_2$ is uniform in S, our probability of success is given by the probability that $U_2 \subseteq S$, which is equal to $$\left(\frac{|S|}{|S_1|}\right)^{k_2} \ge \left(\frac{\alpha-1/2}{\theta^2}\right)^{k_2},$$

which completes the proof.

Note that when $\alpha > \frac{1}{2}$, $\beta$, and $\theta$ are constants, the purification procedure will run in a constant number of iterations. Our main result of this section is the following.

Theorem 7 Suppose $\alpha > \frac{1}{2}$. Assume $\alpha$, $\beta$, $\theta$, and $\delta$ are constants. If v is chosen uniformly at random from S, then with probability at least $(2\alpha-1)(1-\delta)$ we can find S in time $O(t \log t)$.

Theorem 7 implies that if we choose the seed vertex randomly and uniformly from the entire vertex set V, then with probability $\Omega(t/n)$ we will recover S in time $O(t \log t)$. Thus given t this immediately gives an algorithm for finding S with a constant probability in time $O(n \log t)$. In addition, it is not hard to see that the algorithm in Theorem 6 will work and output S with a constant probability even if t is given to it only up to some small multiplicative error. As a corollary of Theorem 6, we see that the number of communities is actually linear.

Theorem 8 Suppose that $\alpha > \frac{1}{2}$. The total number of $(\theta, \alpha, \beta)$-self-determined communities is bounded by $$O\left(n \cdot \frac{1}{\min(\gamma, 1/2-\alpha)} \cdot \left(\frac{\theta^2}{\alpha-1/2}\right)^{O\left(\frac{\log(\theta/\delta\gamma(\alpha-1/2))}{\gamma^2}\right)}\right),$$

which is $O(n)$ if $\alpha$, $\beta$, and $\theta$ are constants.

Note: Observe that Algorithm 4 can be combined with our reduction from weighted to unweighted communities to obtain a local algorithm for finding communities in the weighted case.

Extending the local approach to the multi-faceted setting is more involved, since the definition of R(v) would need to be adapted to this setting. Indeed, the multi-faceted version $R_f(v)$ of R(v) can be taken to be a random element voted by a random facet i of v. Then Algorithm 4 can be adapted by taking the threshold to be $$\frac{(\alpha-1/2)/(\theta^2 f^2)}{t},$$

where f is the number of facets. Note that while an approximation to any community S can be found locally in near-linear time, finding the exact community S as well as the facet structure on S as in Lemma 4 will still take $t^{O(\log n/\gamma^2)}$ time.

Figure 9:
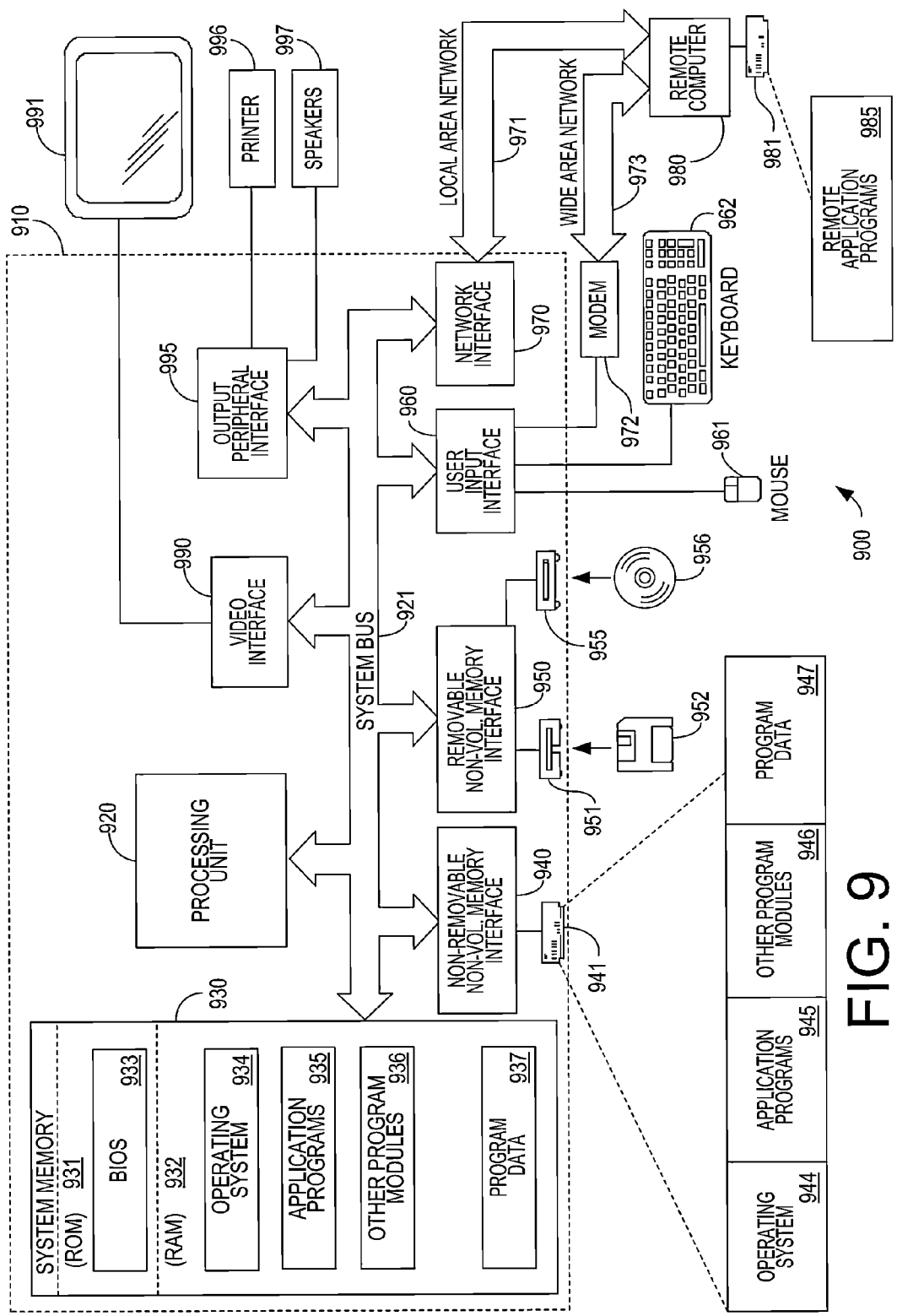
FIG. 9 is an exemplary architecture of a computing device on which one or more processes associated with forming or applying clusters may be performed.

The above algorithms can be executed in any suitable computing environment. FIG. 9 illustrates an example of a suitable computing system environment 900 on which the processing described above may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, an "affinity system" was illustrated in connection with a system in which affinities were derived from expression by humans of personal likes or dislikes for other humans. It should be appreciated that the concept of "affinity" is not limited to inter-personal relationships or even to expressions of human likes or human emotions. Any metric indicating a similarity or connectedness between items, in some dimension, may serve as an expression of affinity.

For example, items such as photographs may be clustered and/or tagged using an affinity metric defined based on user input that the items belong together. Though, it should be appreciated that some form of machine learning or even image analysis techniques may be applied to generate an affinity metric showing a relationship between images. As another example, products for sale or rent through a website may be clustered and/or tagged using an affinity metric defined based on a frequency with which products are purchased or rented by the same person. As yet a further example, the items may be other inanimate objects, such as videos or web pages.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one computer-readable memory, which is not a signal, comprising computer-executable instructions that, when executed by at least one processor, perform a method, the method comprising acts of:
   receiving inputs relating to a plurality of entities in a set, each input indicating approval of an entity in the set for another entity in the set;
   maintaining a database storing indications of approval associated with each of the plurality of entities in the set;

processing the database to determine one or more clusters in the set, the clusters each comprising entities for which a metric of approval of members within the cluster exceeds a metric of approval from entities in the set that are not in the cluster, the processing the database to determine one or more clusters in the set includes:

selecting an entity as a seed for the cluster;

adding entities to the cluster, the adding comprising iteratively:

for a candidate entity determining a fraction of indications of approval for the candidate entity received from entities within the cluster; and selectively adding the candidate entity based, at least in part, on the fraction being above a threshold; and after selectively adding the candidate item, selectively removing items from the cluster that do not meet at least one relatedness criteria; and presenting a suggestion, the suggestion relating to an action involving one or more entities and the suggestion being developed based on the one or more clusters such that the one or more entities are within at least one of the one or more clusters.

2. The computer-readable memory of claim 1, further comprising attaching a semantic tag to entities within a cluster of the one or more clusters.

3. The computer-readable memory of claim 2, wherein the presenting a suggestion comprises, when the semantic tag is attached to the entity, suggesting to an entity a connection with one or more other entities to which the semantic tag was attached.

4. The computer-readable memory of claim 2, wherein the selectively removing items from the cluster that do not meet at least one relatedness criteria is performed in response to a previous selectively adding the candidate entity based changing the one or more degrees of relatedness and one or more degree of relatedness criteria of the selectively removed items.

5. The computer-readable memory of claim 1, wherein the entity selected as the seed is an item in a dataset about which information has been requested by a user, and wherein the candidate entity has a node in a graph that is close to a node representing the seed.

6. A method comprising:

receiving inputs relating to a plurality of entities in a set, each input indicating approval of an entity in the set for another entity in the set;

maintaining a database storing indications of approval associated with each of the plurality of entities in the set;

processing the database to determine one or more clusters in the set, the clusters each comprising entities for which a metric of approval of members within the cluster exceeds a metric of approval from entities in the set that are not in the cluster, the processing the database to determine one or more clusters in the set includes:

selecting an entity as a seed for the cluster;

adding entities to the cluster, the adding comprising iteratively:

for a candidate entity determining a fraction of indications of approval for the candidate entity received from entities within the cluster; and selectively adding the candidate entity based, at least in part, on the fraction being above a threshold; and after selectively adding the candidate item, selectively removing items from the cluster that do not meet at least one relatedness criteria; and presenting a suggestion, the suggestion relating to an action involving one or more entities and the suggestion being developed based on the one or more clusters such that the one or more entities are within at least one of the one or more clusters.

7. The method of claim 6, further comprising attaching a semantic tag to entities within a cluster of the one or more clusters.

8. The method of claim 7, wherein the presenting a suggestion comprises, when the semantic tag is attached to the entity, suggesting to an entity a connection with one or more other entities to which the semantic tag was attached.

9. The method of claim 7, wherein the selectively removing items from the cluster that do not meet at least one relatedness criteria is performed in response to a previous selectively adding the candidate entity based changing the one or more degrees of relatedness and one or more degree of relatedness criteria of the selectively removed items.

10. The method of claim 6, wherein the entity selected as the seed is an item in a dataset about which information has been requested by a user, and wherein the candidate entity has a node in a graph that is close to a node representing the seed.

11. A method comprising:

processing a database to determine one or more clusters in a set of plural entities, the clusters each comprising entities for which a metric of approval of members within the cluster exceeds a metric of approval from entities in the set that are not in the cluster, the processing the database to determine one or more clusters in the set including:

selecting an entity as a seed for the cluster;

adding entities to the cluster, the adding comprising iteratively:

for a candidate entity determining a fraction of indications of approval for the candidate entity received from entities within the cluster; and selectively adding the candidate entity based, at least in part, on the fraction being above a threshold; and after selectively adding the candidate item, selectively removing items from the cluster that do not meet at least one relatedness criteria; and presenting a suggestion relating to an action involving one or more entities, the suggestion being developed based on the one or more clusters such that the one or more entities are within at least one of the one or more clusters.

12. The method of claim 11, further comprising attaching a semantic tag to entities within a cluster of the one or more clusters.

13. The method of claim 12, wherein the presenting a suggestion comprises, when the semantic tag is attached to the entity, suggesting to an entity a connection with one or more other entities to which the semantic tag was attached.

14. The method of claim 12, wherein the selectively removing items from the cluster that do not meet at least one relatedness criteria is performed in response to a previous selectively adding the candidate entity based changing the one or more degrees of relatedness and one or more degree of relatedness criteria of the selectively removed items.

15. The method of claim 11, wherein the entity selected as the seed is an item in a dataset about which information has been requested by a user, and wherein the candidate entity has a node in a graph that is close to a node representing the seed.

* * * * *